United States Patent [19]

Miller et al.

[11] Patent Number: 5,043,066
[45] Date of Patent: Aug. 27, 1991

[54] FLUID PURIFYING APPARATUS AND METHOD OF PURIFYING FLUIDS

[75] Inventors: Steven L. Miller, Shelby County; Ronald L. Wathen; Raymond E. Palazzo, Jr., both of Jefferson County, all of Ky.

[73] Assignee: Environmental Water Technology, Inc., Louisville, Ky.

[21] Appl. No.: 596,015

[22] Filed: Oct. 11, 1990

Related U.S. Application Data

[62] Division of Ser. No. 515,459, Apr. 27, 1990.

[51] Int. Cl.$^5$ ............................................. B01D 61/08
[52] U.S. Cl. .................. 210/257.2; 210/540; 210/541; 264/219; 264/239
[58] Field of Search ............... 210/195.2, 257.1, 257.2, 210/321.6, 540, 541, 251, 336; 264/219-227, 239, 241, 248-250, 251, 259, 260, 263, 261, 265-267

[56] References Cited

U.S. PATENT DOCUMENTS 3,643,805  2/1972  Hoffman .......................... 264/261
3,710,946  1/1973  Sawyer ............................. 210/336

Primary Examiner—Frank Sever
Attorney, Agent, or Firm—Polster, Polster, Lucchesi

[57] ABSTRACT

In a fluid purification arrangement for a reverse osmosis treatment system which system includes a ported header with spaced port connections, a fluid impervious treatment container with at least one compartment and a matching ported header mounted thereto to permit connection of the treatment container to the header of the treatment system.

11 Claims, 17 Drawing Sheets

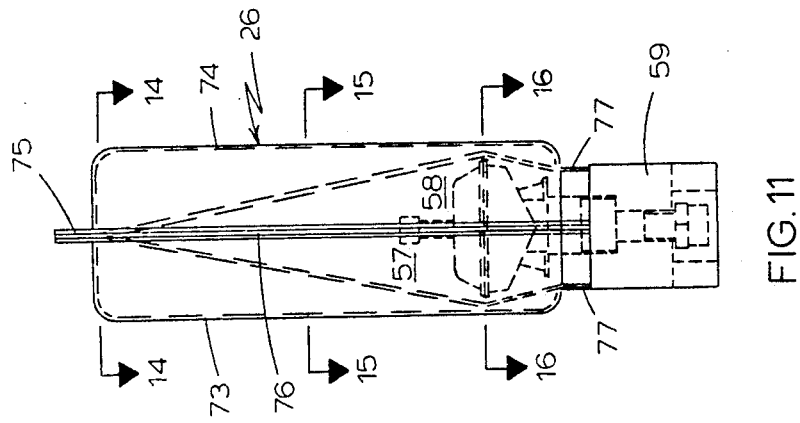
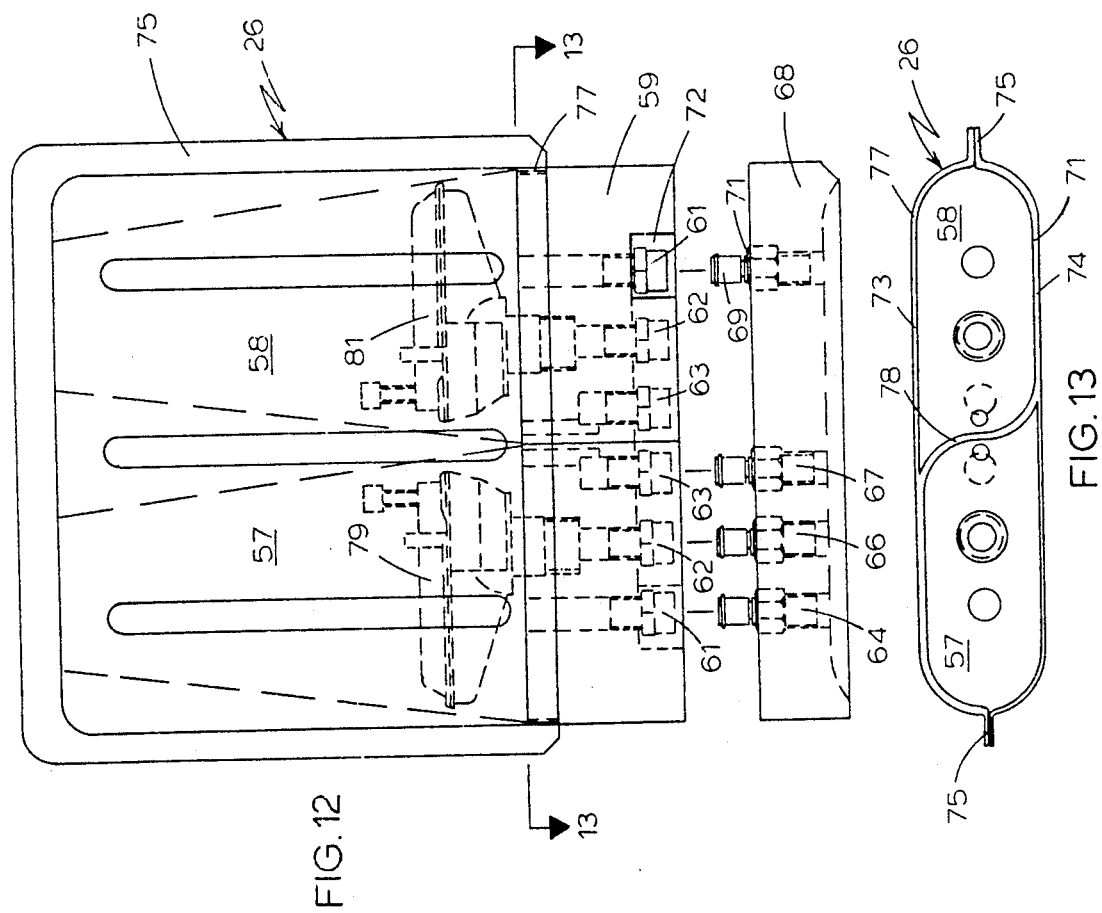
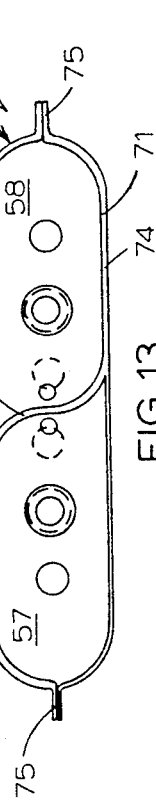

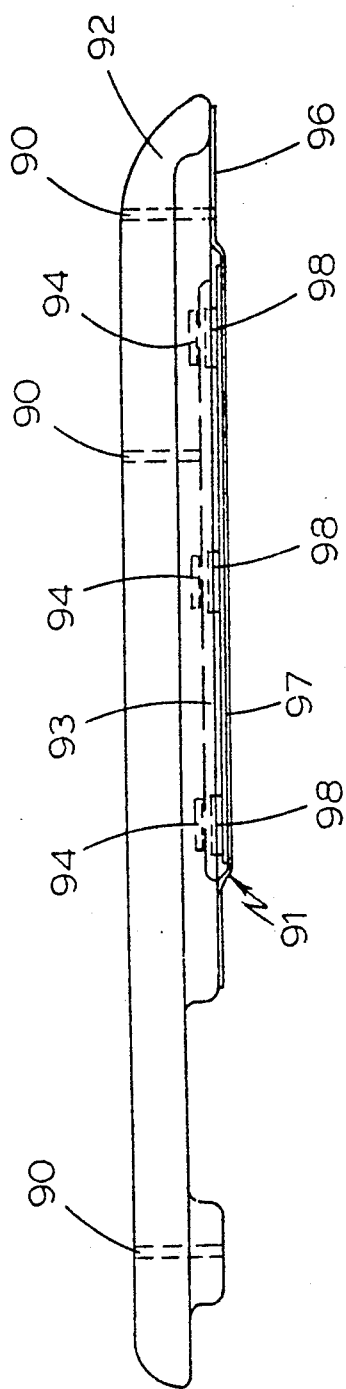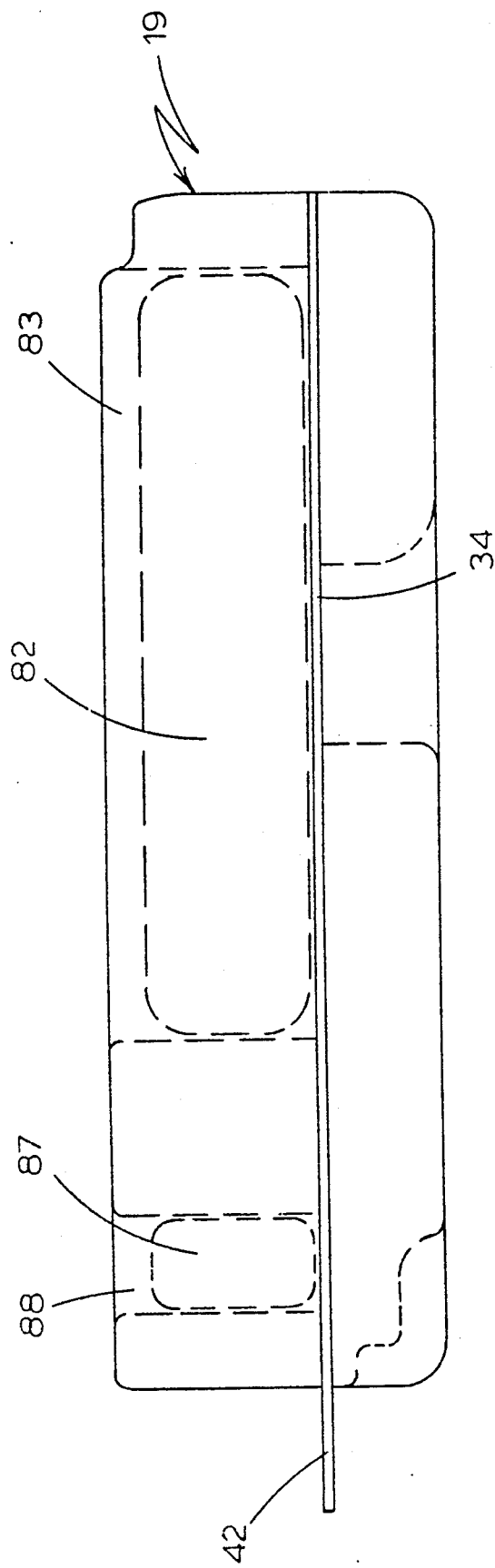
FIG.19

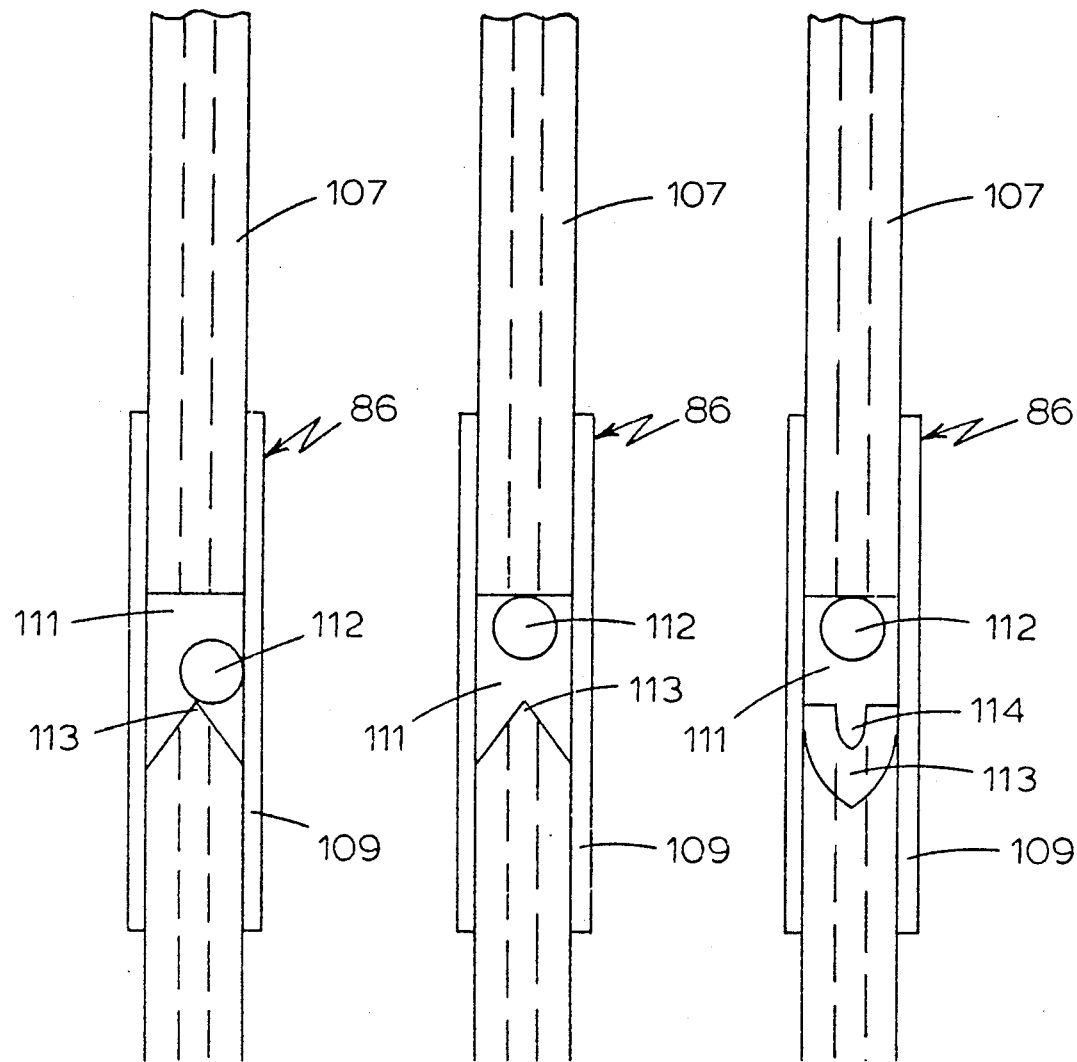

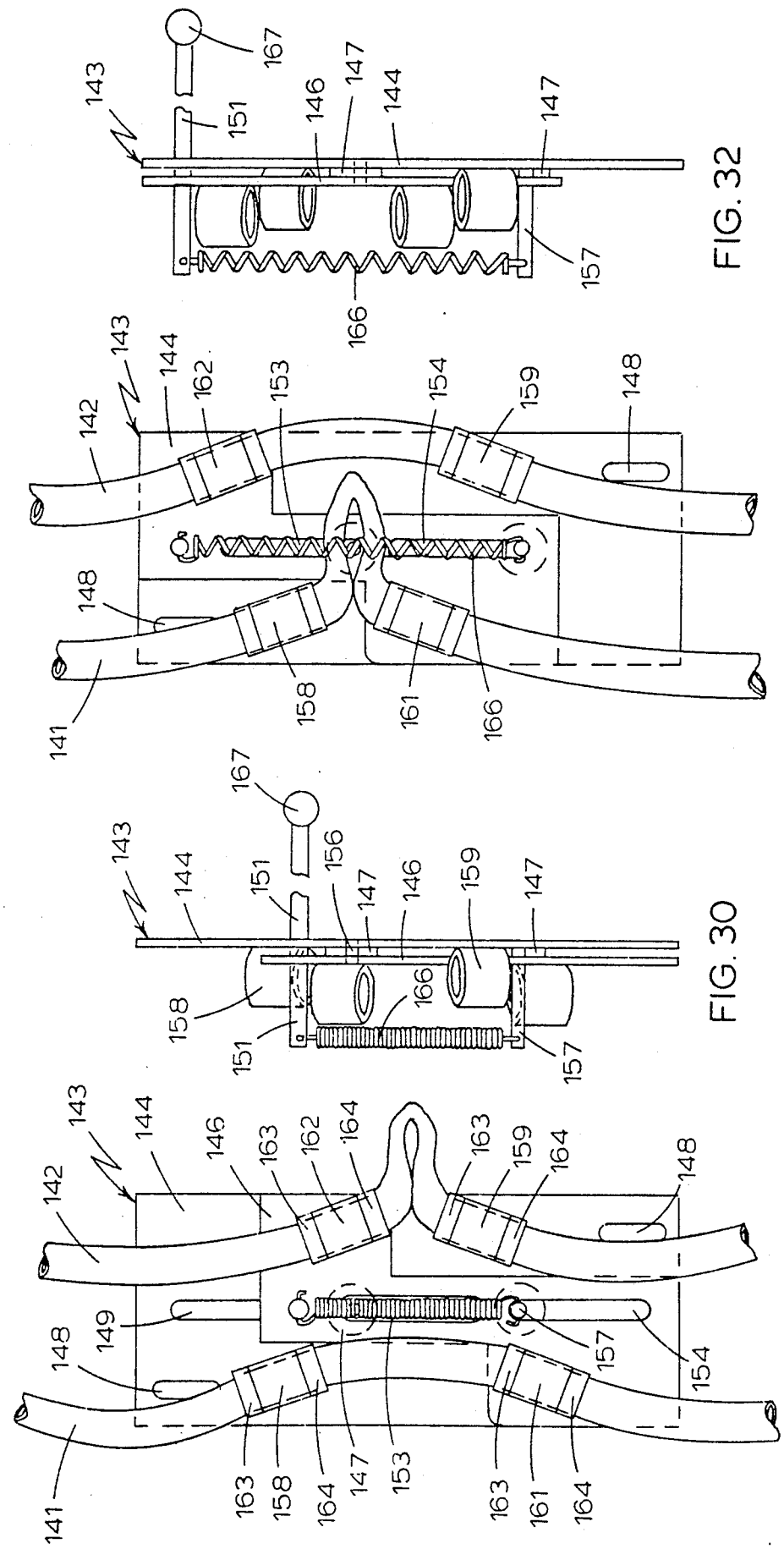

FLUID PURIFYING APPARATUS AND METHOD OF PURIFYING FLUIDS

This is a divisional application of Ser. No. 07/515,459, filed 4/27/90, now pending.

BACKGROUND OF THE INVENTION

The present invention relates to fluid purifying apparatus and a method of purifying fluids and more particularly to a novel, compact structure suitable for purifying liquids such as water and to a novel method of accomplishing such liquid purification.

It presently is known in the art of fluid purification to include in a fluid purifying system an arrangement for passing fluid to be purified such as liquid water from the feed side of a reverse osmosis unit to the product side of the reverse osmosis unit and then to an ultimate user during a purifying cycle and then, during a treatment cycle of the reverse osmosis unit, which treatment cycle includes disinfection/rejuvenation, to recirculate the liquid from the product side of the reverse osmosis unit back to the feed side in by-pass relation to the reverse osmosis unit in order to introduce suitable treating fluids through separate jugs or containers to disinfect and rejuvenate the system. Such a so-called "loop system" arrangement can be seen in U.S. Pat. No. 4,784,771, issued to Ronald L. Wathen, et al. on Nov. 15, 1988. It also is known in the fluid purification art to utilize, before and after a fluid filtering means, which includes a carbon filter, an ultra-violet light-emitting tube, attention being directed to U.S. Pat. No. 4,769,131, issued to J.R. Noll on Sept. 6, 1988. Further, it is known in the fluid purification art to utilize a thermoelectric heat transfer module in such a manner that the cool side thereof is in thermal communication with a purified fluid, such as water contained in a storage chamber, a tap water and waste water supply being utilized to carry heat energy away from the hot side of the heat transfer module. Attention, in this regard, is being directed to U.S. Pat. No. 4,752,389, issued to Bruce D. Burrows on July 21, 1988. Finally, it is generally known to utilize an expandable fluid chamber within a confined zone with sensing and actuating means to control fluid flow to the chamber when the chamber reaches an expanded level, attention being directed to U.S. Pat. No. 3,089,513, issued to C.H. Kirk, Jr. on May 14, 1936 and U.S. Pat. No. 4,604,194, issued to M.E. Engingh on August 5, 1986.

Recognizing the limitations of these several aforenoted structures and further recognizing the need for a highly efficient, compact fluid purification apparatus particularly adapted for water purification, the present invention provides a fluid purification apparatus and method of purifying a fluid, such as water, which allows for ready, efficient, and economical manufacture, assembly, shipping, storage, maintenance and use. More specifically, the present invention provides for an improved flow-through housing arrangement for a water purification system which allows for ready, uniform ambient air flushing and cooling of several select parts of the system with a unique arrangement for diverting and exhausting outlet air from the system with a minimum of noise and air intrusion, utilizing the housing and liquid drain receptacle to accomplish the same and at the same time allowing ready removal of the drain receptacle. Further, the present invention provides for an improved, economical flow control in a reverse osmosis treatment loop and for a unique, unitary disinfection and rejuvenation container in such reverse osmosis treatment loop of a water purification system, the container being of unitary stable and balanced construction and yet allowing for ready alternative selection and introduction of disinfection and rejuvenation fluids into the treatment loop. In addition the present invention provides for a unique arrangement for treating fluids in a fluid purification system with ultra-violet radiation before the system pump, after the reverse osmosis purification and after storage but before tap usage in the system. Also, the present invention provides a novel fluid storage and bag assembly arrangement, including a unique arrangement for controlling, heating and cooling fluid in the storage arrangement and a unique modification for heating fluid in a storage chamber to purify the same for distillation introduction into a cold storage chamber, the cold and heated chambers utilizing the cool and hot sides of a thermoelectric module respectively in the treatment of the liquid, with the purifying effects of distillation in the modification serving in place of and/or in conjunction with a novel step of ultra-violet radiation treatment before passage to tap use. Moreover, the present invention provides a novel compact and efficient structural arrangement for mounting a hinged housing cover which nestingly receives the liquid tap and a novel arrangement for mounting the pump and filters included in the liquid filtration system so as to provide a compact, balanced unit assembly which isolates residual vibrations of the pump in the housing in which the assembly is disposed. In addition, the present invention provides novel, straightforward and economical to manufacture fluid flow control apparatus, eliminating costly check and solenoid valves otherwise required.

Various other features of the present invention will become obvious to one skilled in the art upon reading the disclosure set forth herein.

BRIEF SUMMARY OF THE INVENTION

More particularly, the present invention provides a liquid purification apparatus comprising: walled housing means having an ambient inlet opening therein, the housing means defining a plenum chamber preselectively sized to compactly contain a liquid purification system therein to communicatively extend between a liquid inlet and a liquid outlet in the wall housing means, the liquid purification system including a pump to move the liquid from the liquid inlet to the liquid outlet, a liquid storage receptacle having a heat transfer means with a heat exchange element associated therewith and a blower mounted in the chamber in communication with the ambient inlet opening in the walled housing means to circulate air over the heat exchange element; a walled drain receptacle communicatively positioned below the plenum chamber with the side walls thereof in spaced relation to the walled housing means to define an air exhaust passage therebetween, the drain receptacle serving to receive and evaporate condensed liquids from the liquid purification system in the plenum chamber thereabove with the air exhaust passage being sized and positioned adjacent to the bottom periphery of the walled housing means to serve as a dispersing and sound baffling exhaust for air circulated by the blower over the heat exchange element and through the remainder of the liquid purification system. In addition, the present invention provides for a liquid purification system which includes a filter membrane, a storage receptacle and tap downstream the storage receptacle with ultraviolet treating apparatus before the filter, between the filter and storage receptacle and between the storage receptacle and the tap. Further, the present invention provides not only a novel, insulated sandwiched plate storage receptacle but also a thin collapsible-expansible gas and liquid storage bag assembly arrangement in the receptacle with a unique planar switch apparatus to control liquid flow to the bag, the storage bag arrangement including at least two fluid connected bags, one for storing hot fluids and the other cold fluids. In the present invention, the two assembled hot and cold bags are uniquely arranged to allow further purification of the liquid therein, either through the aforedescribed ultra-violet radiation apparatus or through a novel distillation of the liquid as it passes from the hot to the cold chamber. Moreover, the present invention utilizes a unique reverse osmosis loop system in the course of liquid purification, the loop system including a novel arrangement for controlling liquid flow in the primary and drain circuits, as well as a novel unitary container for alternatively introducing disinfection/rejuvenation treatment fluids into the system. The present invention also provides a unique and novel method and a modification thereof for liquid purification the combined steps of which can be in association with the novel apparatus described herein. Further, the present invention provides a novel arrangement which reduces pump vibration by uniquely isolating the pump from the housing in which it is disposed. In addition, the present invention provides unique fluid control mechanism for the purification system, including novel flow check and alternative flow control arrangements.

It is to be understood that various changes can be made by one skilled in the art in one or more of the several parts of the novel apparatus described herein and in one or more of the several steps of the unique method herein described without departing from the scope or spirit of the present invention.

BRIEF DESCRIPTION OF THE DRAWINGS

Referring to the several figures of the drawings which illustrate both schematically and in detail, an advantageous embodiment of the present invention and novel modifications thereof:

FIG. 11 is an enlarged partially broken away end view of the novel disinfection/rejuvenation container disclosed in FIGS. 1 and 3 of the drawings;

FIG. 12 is an exploded side view of the container of FIG. 11, further illustrating the header and header connections associated therewith;

FIG. 13 is a cross-sectional view of the container of FIGS. 11 and 12 taken in a plane through line 13—13 of FIG. 12;

FIG. 19 is a partially broken away exploded view taken from a reverse side of the novel storage receptacle of FIGS. 1, 3, 5 and 6 of the drawings, disclosing schematically the novel planar switch assembly to control storage chamber volume;

Figure 7:
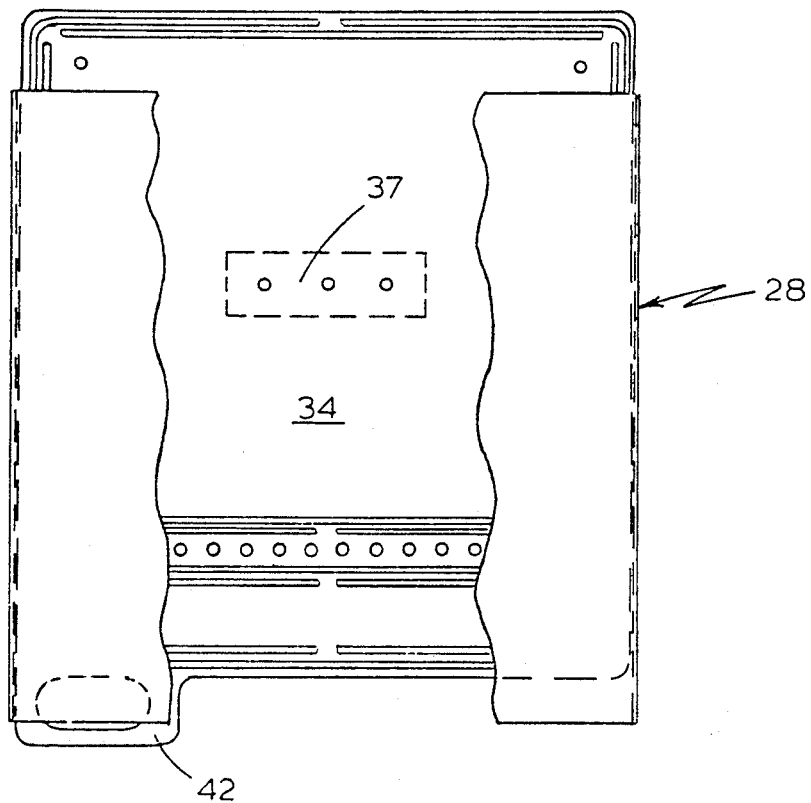
FIG. 7 is a partially broken away top view of the housing assembly of FIGS. 5 and 6 with a portion of the storage receptacle removed in order to disclose the novel plate arrangement included therewith.
Figure 5:
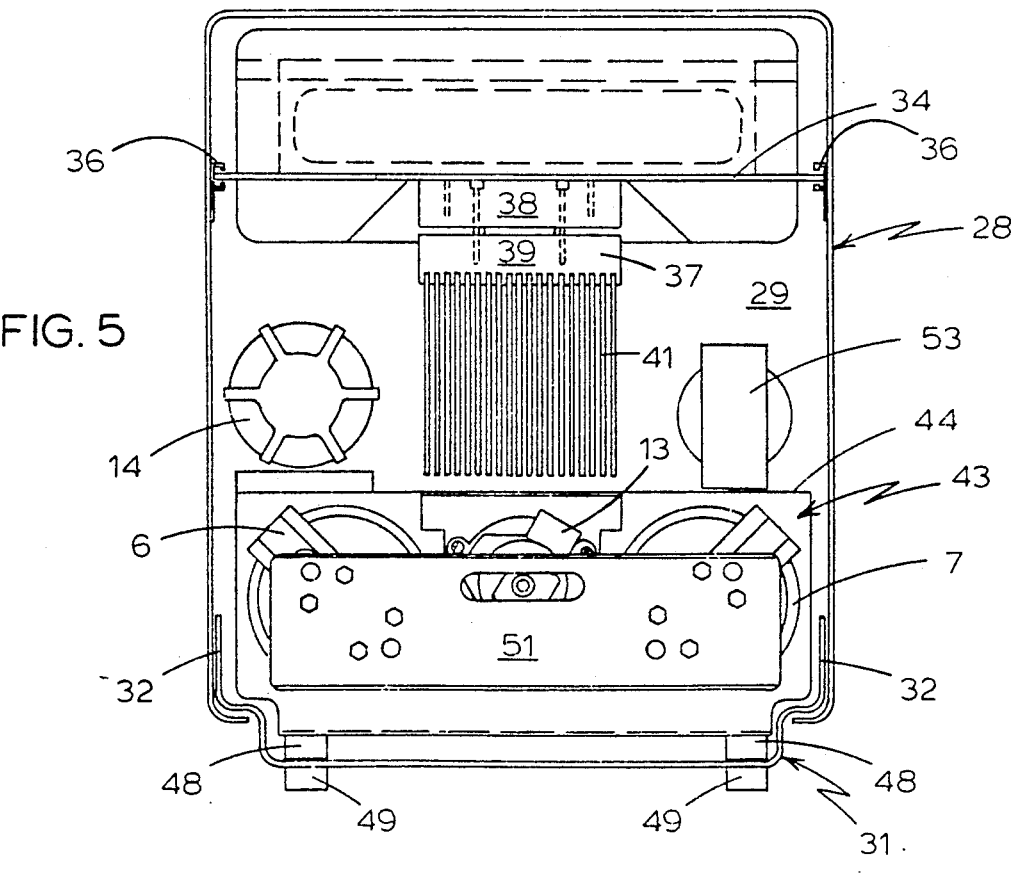
FIG. 5 is a schematic front end, partially broken away view of the novel housing arrangement of the present invention showing the unique spacing between housing and drain receptacle side walls with the disinfection/rejuvenation container removed in order to show a portion of the novel frame assembly for supporting the filters and pump as a unit in the lower portion of the housing, the novel storage receptacle in the upper portion of the housing with the thermal heat transfer and heat exchanger arrangement suspended therefrom and the spaced reverse osmosis container and power supply unit disposed on either side of the heat exchanger.
Figure 6:
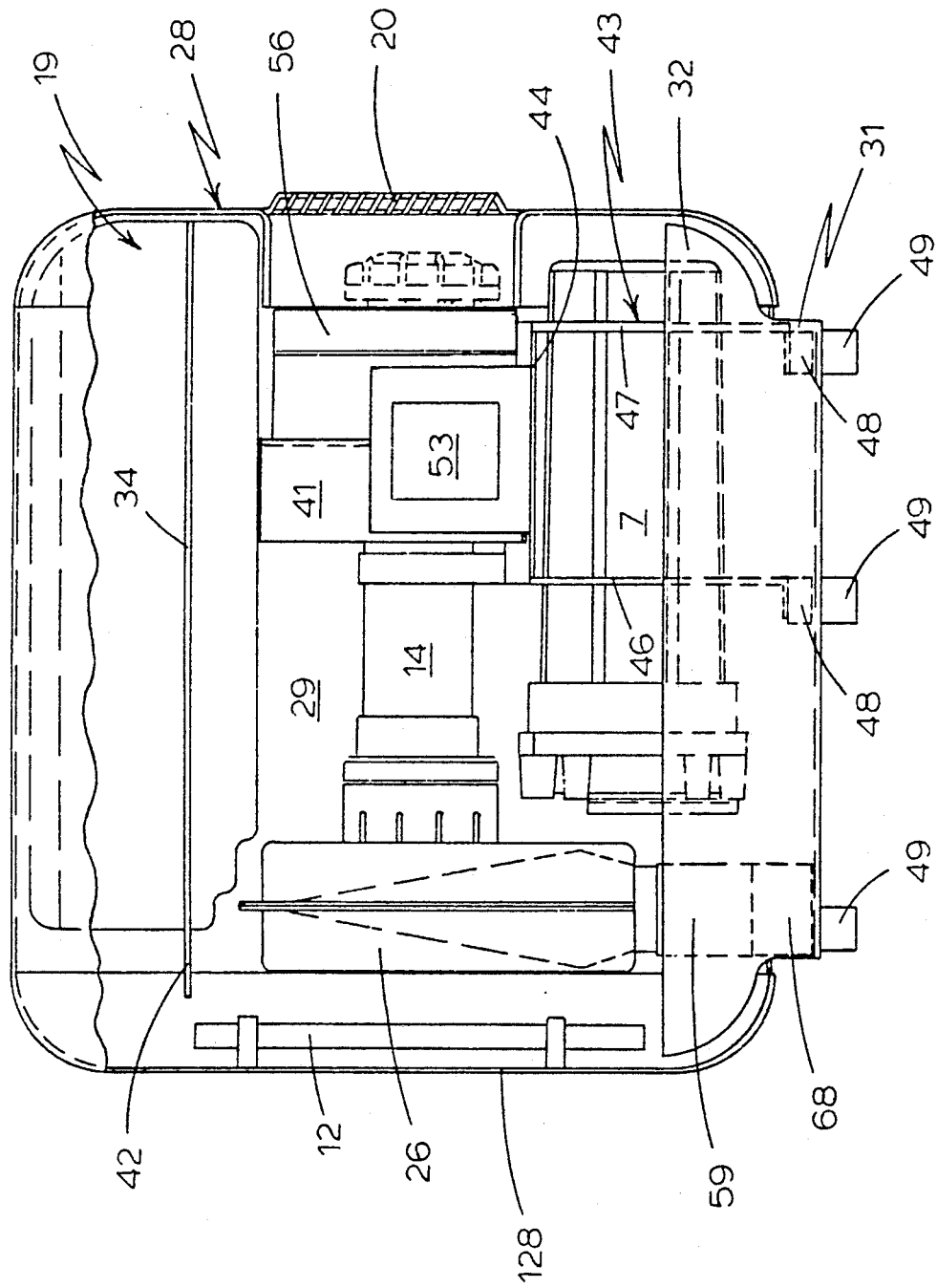
FIG. 6 is a schematic side view of the novel housing arrangement of FIG. 5 disclosing the front and rear end cover and disinfection/rejuvenation unit ordinarily only present during a treatment cycle, which parts were not included in FIG. 5 for the purposes of illustration and further disclosing the blower and ambient inlet associated therewith which is utilized to move an air stream over the heat exchanger and other parts of the housing to be exhausted downwardly through the passage between the spaced housing and drain receptacle.
Figure 20:
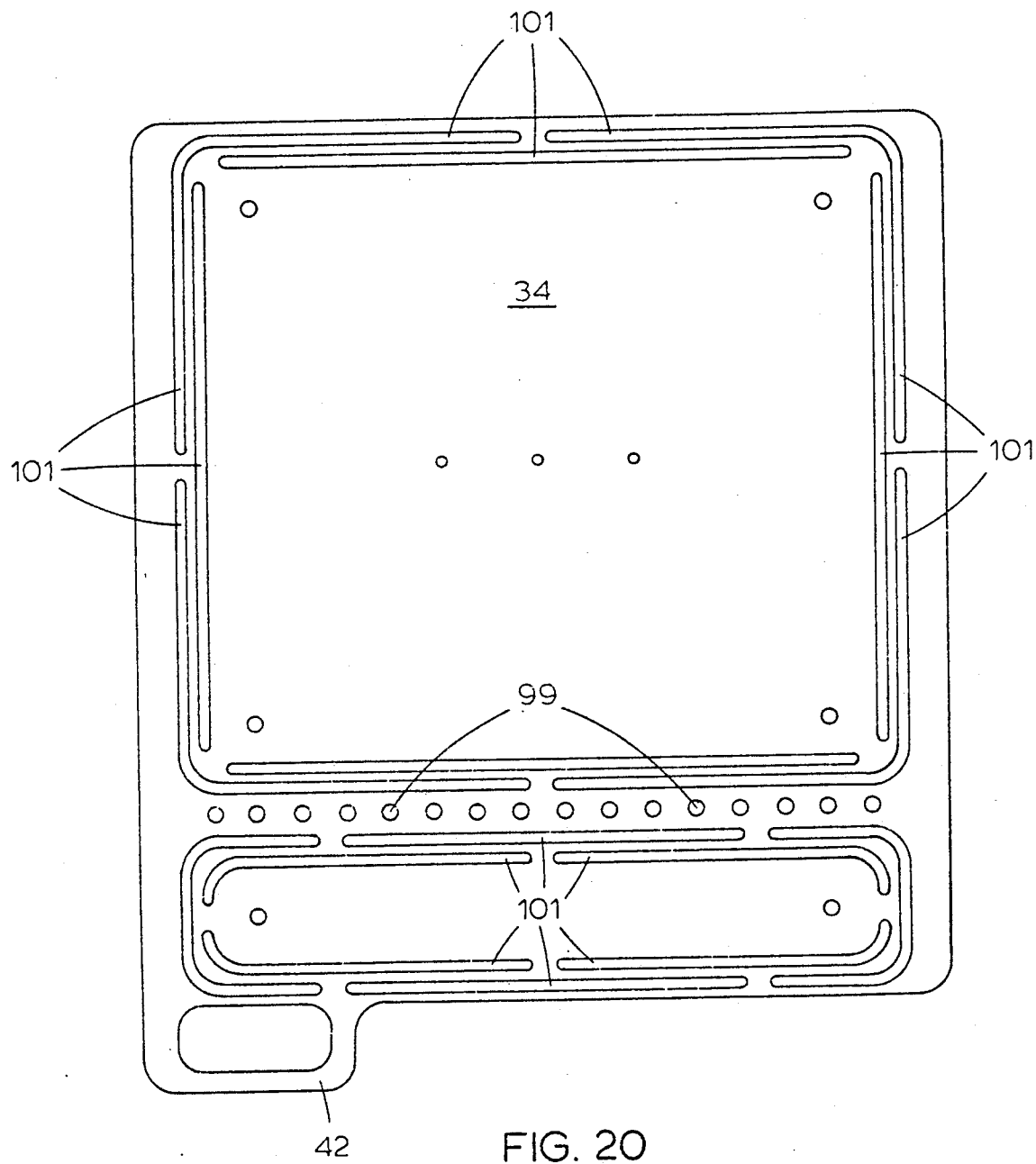
FIG. 20 is a plan view of the novel plate member incorporated as part of the storage receptacle disclosing how this plate member becomes part of a novel molding process.
Figure 27:
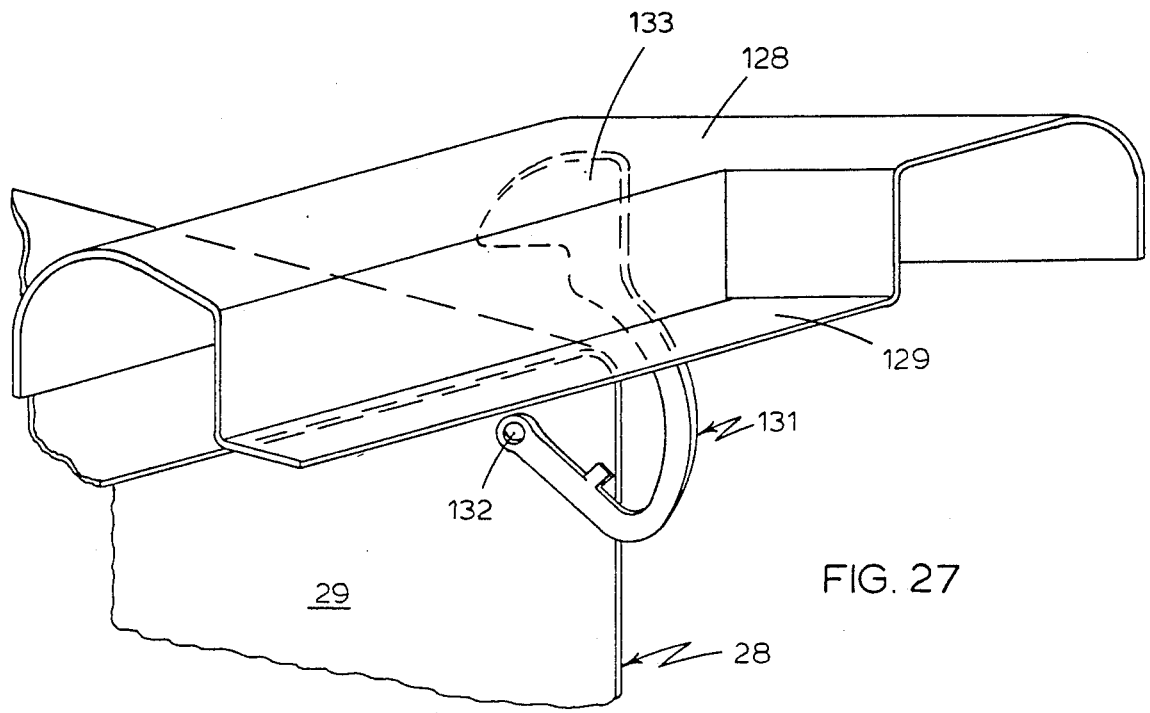
Figure 26:
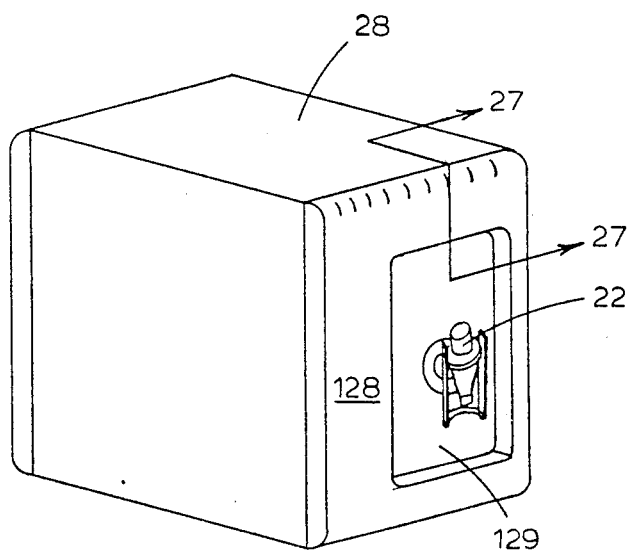
Figure 28:
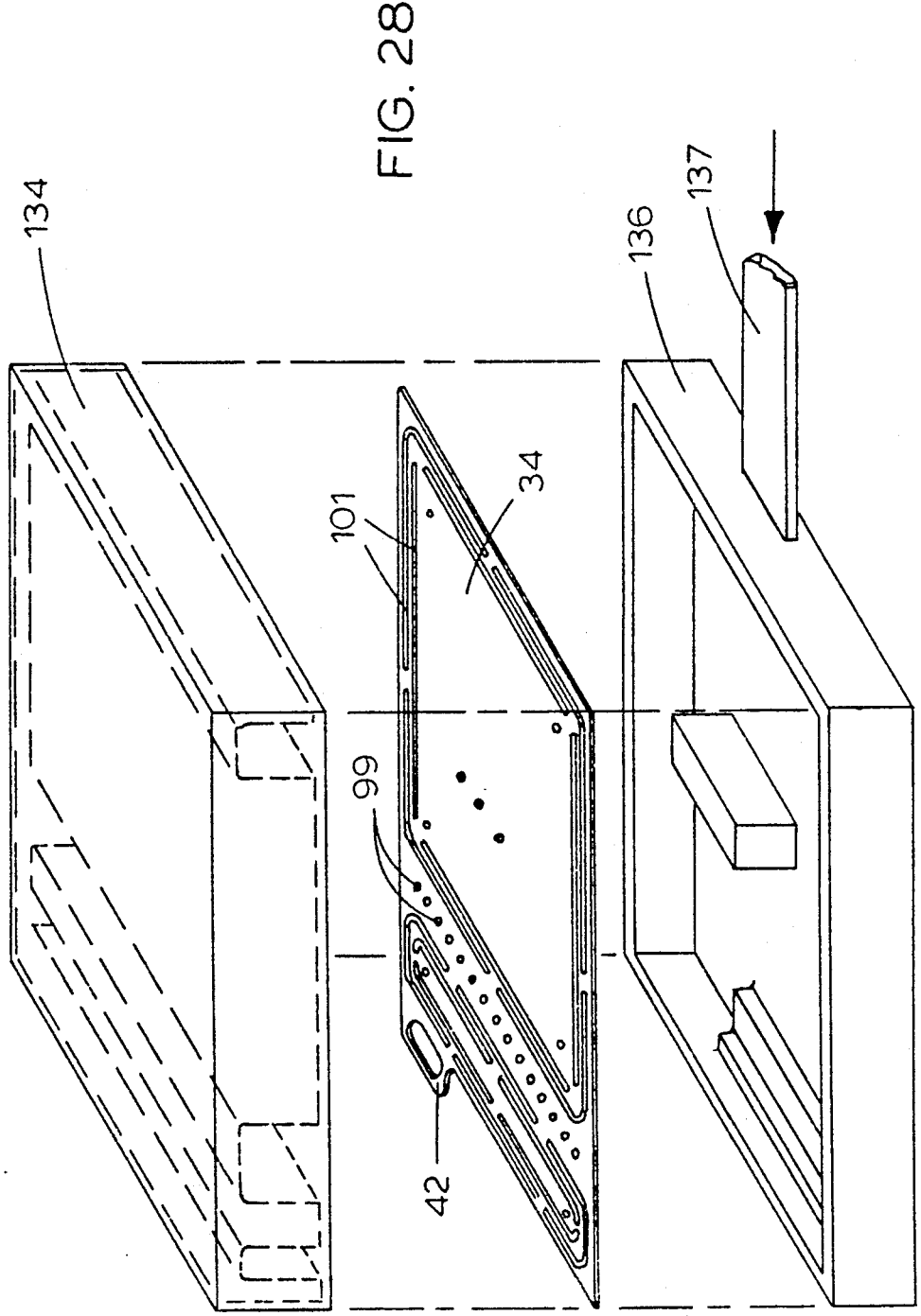

FIGS. 23 and 24 are enlarged front views illustrating two stages of a novel float valve arrangement which can be utilized in conduit circuitry such as schematically disclosed in FIGS. 1-4;

FIG. 25 is an enlarged side view of the float valve stage illustrated in FIG. 24;

FIG. 26 is a reduced isometric view of the overall housing of FIGS. 5, 6 and 7;

FIG. 27 is an enlarged partially broken away, schematic and isometric, side view of an upper corner of the novel housing arrangement taken in a plane through line 27—27 of FIG. 26 disclosing a portion of the top cover in open position with a top edge hinge arrangement therefor and further disclosing a portion of the recess in the cover for nestingly accommodating a user tap;

FIG. 28 is an exploded schematic view of a mold method employed in forming the storage receptacle of FIG. 19 including the novel plate member of FIG. 20; and, FIGS. 29–32 schematically disclose plan and partial side views of two stages of a novel fluid flow control arrangement for the two conduits connecting hot and cold storage bag members to the user tap, FIGS. 29 and 30 illustrating the cold fluid flow conduit in open position and the hot fluid flow conduit in closed position and FIGS. 31 and 32 illustrating the reverse condition.

DETAILED DESCRIPTION OF THE DRAWING

Figure 1:
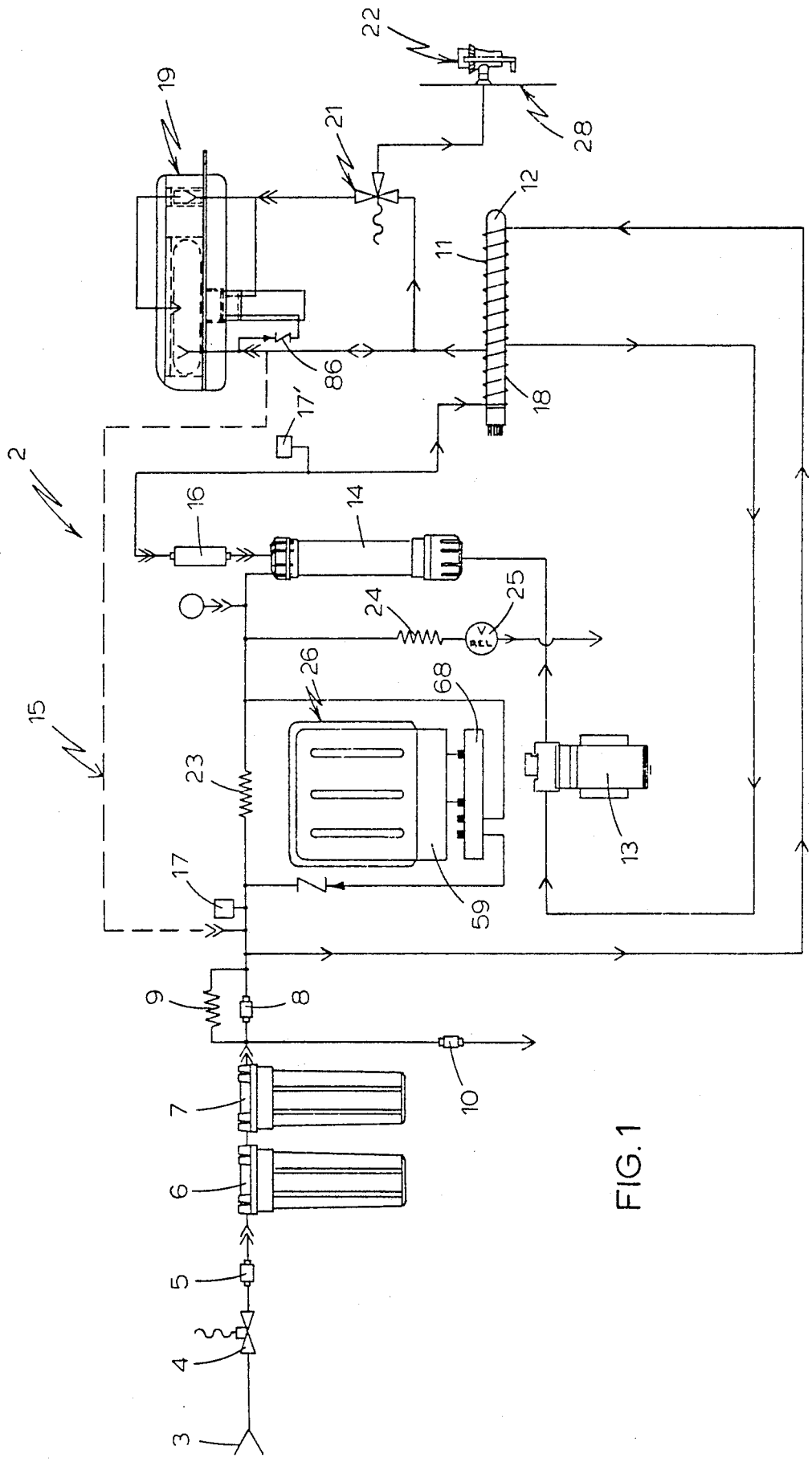
FIG. 1 is a schematic flow diagram of conduit circuitry between the several parts of one advantageous embodiment of the inventive liquid purifying apparatus disclosing the several parts incorporated into the purifying apparatus and the novel features included therein.

Referring to the schematic flow diagram of FIG. 1, liquid to be purified, usually contaminant and bacterial-laden water, from an available supply source (not shown) is introduced into the novel liquid purification system broadly referred to herein by reference number 2 at system inlet 3 of a suitable chemically-resistant plastic tubing, such as a polyethylene tubing. The liquid to be purified passes along the tubing through an opened solenoid valve 4 through ball control shut-off valve 5 which is maintained in open position during normal liquid purification and treatment cycles into the tapered cylindrical prefilter housing 6 which can be of a suitable chemically-resistant plastic material and which contains a suitable particulate-removing material—such as a spun polypropylene of a preselected porosity and depth. From prefilter housing 6, the liquid passes into a second tapered cylindrical housing 7 which also is of a suitable chemically-resistant plastic material and which contains a suitable porous bacteriostatic metal alloy material of preselected porosity and depth and which is capable of releasing copper ions into the liquid stream to arrest bacterial growth. It is to be understood that a commercially-available material, such as one referred to as "KDF," available from the Chemtree Company, can be used along with a suitable and commercially-available granulatar-activated carbon. It further is to be understood that the depth and porosity of the material selected can vary depending upon the nature of the liquid to be treated including such parameters as PH level, hardness and turbidity From ion-adding filter 7, the liquid passes through ball control valve 8 which is maintained in opened position during a normal liquid purification cycle and which is held closed during a disinfection/rejuvenation treatment cycle of the reverse osmosis unit, described hereinafter. In a typical operation, liquid to be purified is introduced into inlet 3 at a volume flow rate of approximately nine hundred (900) to one thousand (1,000) cubic centimeters per minute. During the disinfection/rejuvenation treatment cycle, which is broadly similar to the inventive "loop cycle" as described in aforementioned U.S. Pat. No. 4,784,771, ball control valve 8 is closed and a small amount of feed liquid in the approximate volume flow rate range of seventy-five (75) cubic centimeters per minute is passed through a restrictor orifice 9 which can be made from any one of a number of suitably-porous materials, such as the commercially-available "POREX" material. It is to be noted that a suitable ball-controlled drain valve 10 can be provided before valve 8 to relieve static pressure when desired.

During normal flow operation, the liquid to be treated is passed through helically-wound section 11 surrounding a portion of an ultra-violet radiation tube 12 which advantageously can have a wave length of two hundred and fifty-four (254) nanometers and be non-ozone producing. The liquid then passes through a pump 13 to the feed side of a reverse osmosis unit 14. Pump 13 advantageously can be a commercially-available triple diaphragm, positive displacement pump which serves to minimize pump shear and in turn, temperature increase of the treated liquid during the treatment cycle and to maximize flow rate through the reverse osmosis membrane. From the feed side of the reverse osmosis unit 14, treated liquid passes through a flow meter 16 and a second conductivity probe 17 for measuring water quality—the first conductivity probe 17 being upstream in "loop cycle" 15—to a second helically-wound section 18 also surrounding a portion of ultra-violet radiation tube 12. After a second ultra-violet radiation treatment, the liquid is passed to a unique compartmentalized storage receptacle 19 described in detail hereinafter—which receptacle is capable of heating and/or cooling the liquid to be passed on through a three-way solenoid control 21 to a user tap 22. As is described hereinafter, a novel manually operable fluid flow control mechanism can be utilized, in accordance with the present invention for valve 21.

Figure 2:
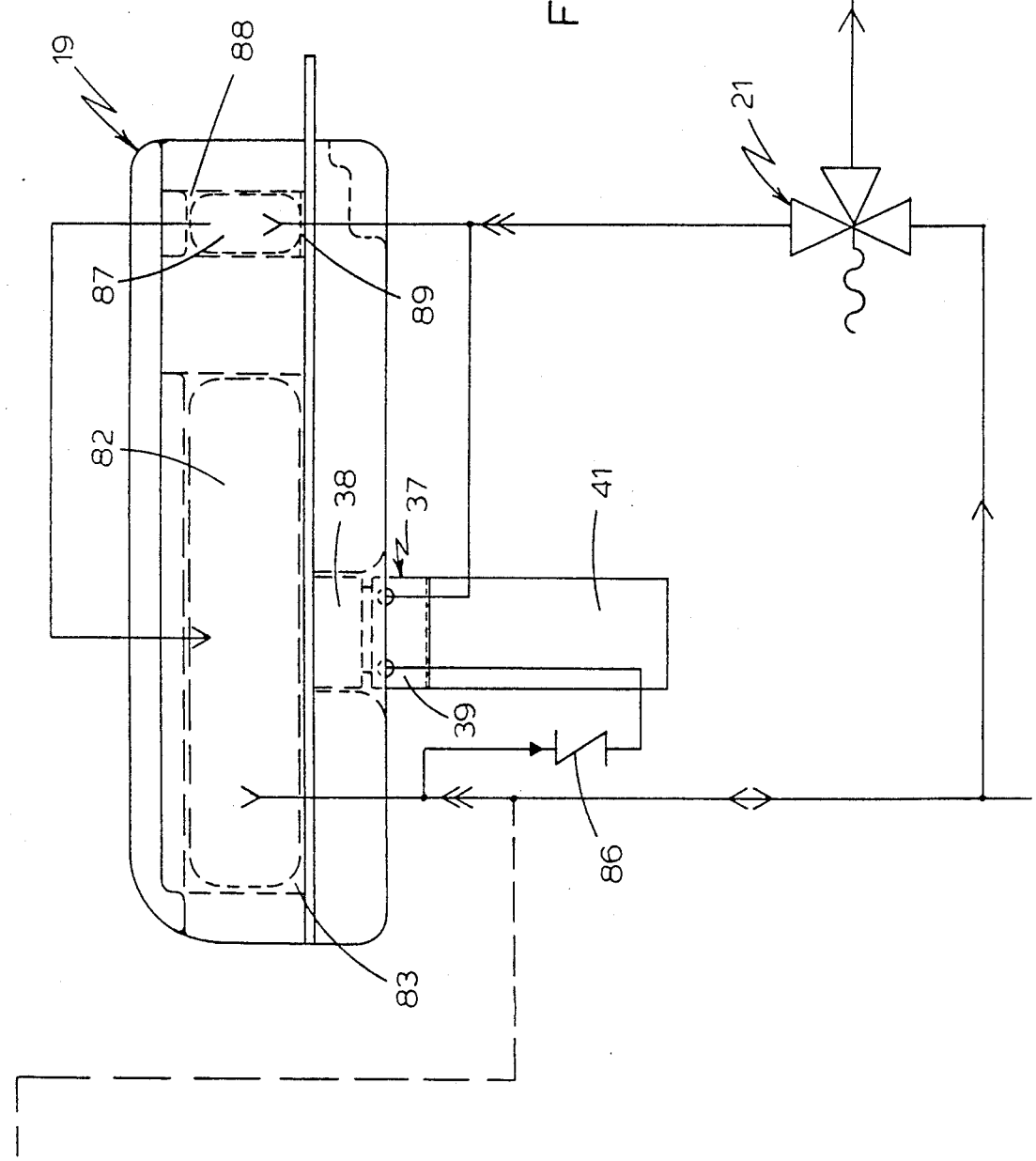
FIG. 2 is an enlarged portion of FIG. 1, disclosing further details of the novel storage receptacle and conduit circuitry included in the flow diagram of FIG. 1.

As above noted, the reverse osmosis unit 14 can be intermittently treated in "loop cycle" 15 in a manner similar to that described in U.S. Pat. No. 4,784,771 and therefore not described in detail herein. However, in accordance with the present invention, additional novel features are now included in the "loop cycle" which allows for a straightforward and economical manner of controlling the rate at which the reverse osmosis unit 14 compacts. This is accomplished through two novel restrictor orifices 23 and 24 respectively which, like restrictor orifice 9, can be economically manufactured from any one of a number of suitable porous materials, such as a material sold by the Porex Company, and which is of preselected porosity to allow a preselected variable resistance to liquid flow between restrictive orifices 23 and 24. Advantageously, restrictor orifice 23, which is downstream the first conductivity probe 17 in the main line of the loop cycle can be selected to allow a flow volume rate of approximately three (3) liters or three thousand (3,000) cubic centimeters per minute and restrictor orifice 24 in the drain line can be selected to allow a smaller flow volume rate of eight hundred and fifty (850) cubic centimeters per minute with a higher ratio between orifices 23 and 24 generally allowing for a more efficient recovery of product water but of lower quality. In addition to the novel restrictor orifice arrangement 23 and 24, the new "loop cycle" also includes a suitable pressure relief valve 25 in the drain line to seal against drain flow during the treatment cycle and a unique and novel treatment container arrangement 26 which provides a unitary container for alternative introduction of disinfection/rejuvenation fluids from one of two compartments in the same container—all in a manner described in detail hereinafter. Also described in detail hereinafter is the flow of fluid through the separate compartments of the compartmentalized storage receptacle 19 (FIGS. 1 and 2).

Figure 3:
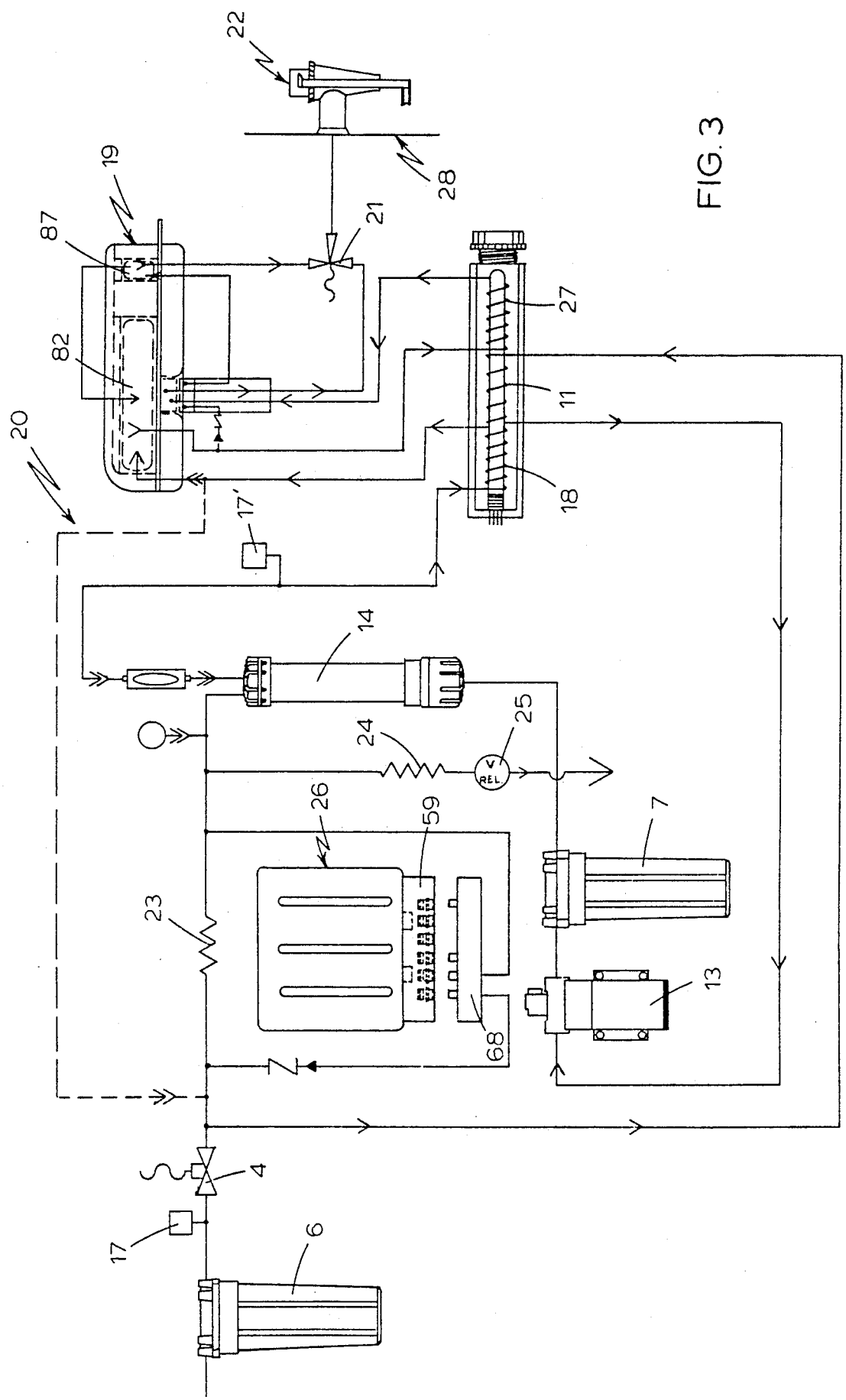
FIG. 3 is a schematic flow diagram of the conduit circuitry between the several parts of a modified embodiment of the inventive liquid purifying apparatus also disclosing the several parts incorporated into a modified purifying apparatus which includes a modified ultra-violet radiation arrangement.
Figure 4:
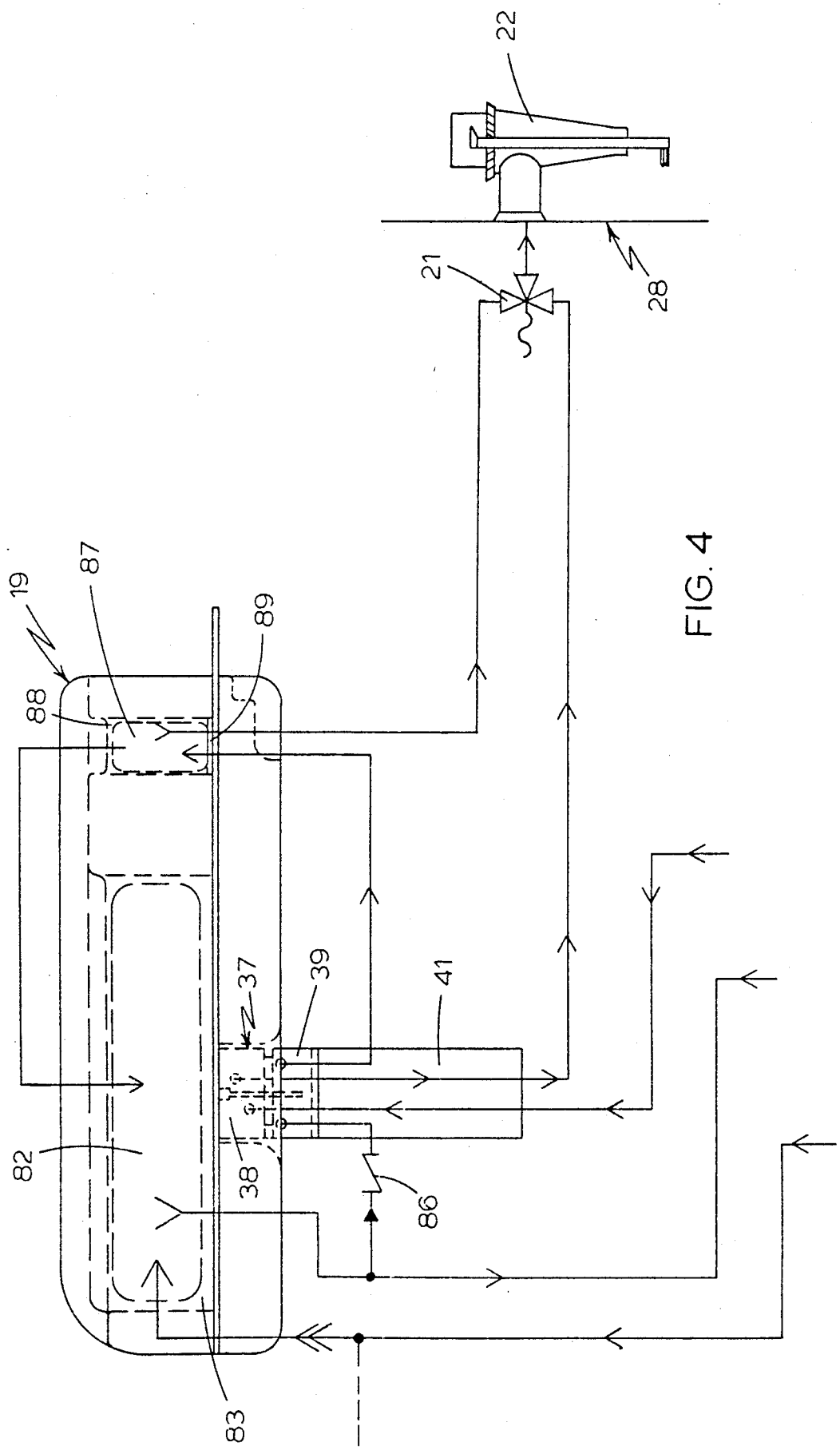
FIG. 4 is an enlarged portion of FIG. 3, disclosing further details of the novel storage receptacle and conduit circuitry included in the flow diagram of FIG. 3.

Referring to FIG. 3 of the drawings, a modified flow diagram 20 from that of FIG. 1 is shown. In this embodiment of the invention, the housing for the ion filter 7 is positioned downstream pump 13 before the reverse osmosis unit and a third helically-wound section 27 is utilized to surround ultra-violet radiation tube 12. This third ultra-violet radiation section 27 is utilized to apply a third ultra-violet treatment to the fluid after it leaves storage receptacle 19, returns to a thermoelectric element associated with receptacle 19 and passes to user tap 22. The flow of fluid through the separate compartments of the compartmentalized storage receptacle 19 for the embodiment of FIGS. 3 and 4 is also described hereinafter. Other than for the principal changes of position of the ion filter 7, the relocation of a conductivity meter, the elimination of a few minor valves, and the additional ultra-violet treatment section 27 surrounding tube 12, the novel parts involved in the flow diagram 20 of FIG. 3 can be substantially like those in the flow diagram 2 of FIG. 1 and accordingly bear like reference numerals.

Figure 9:
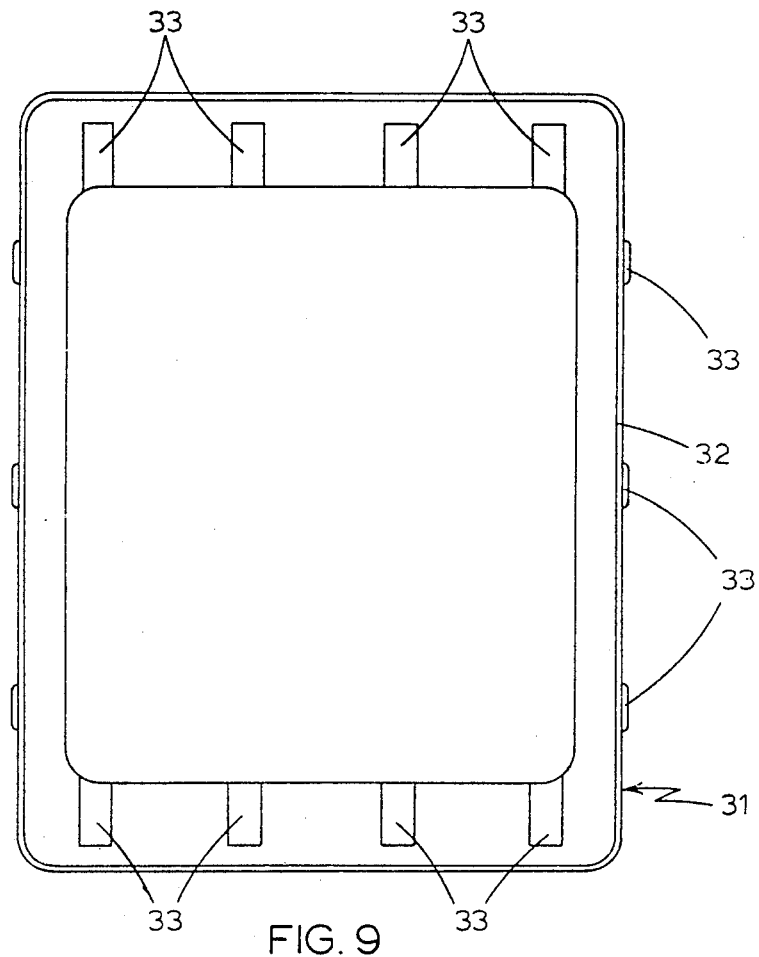
FIG. 9 is a top view of the drain receptacle of FIG. 8.
Figure 10:
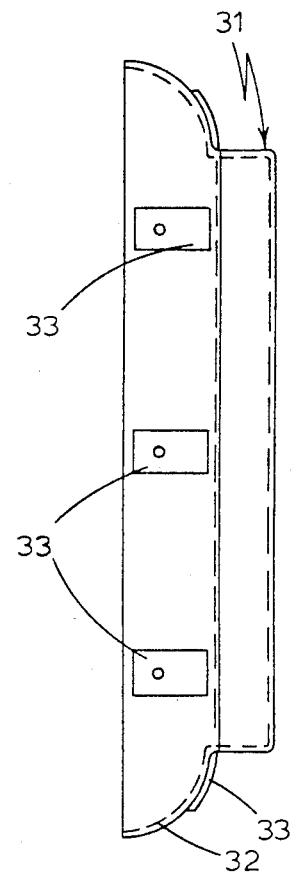
FIG. 10 is a side view of the drain receptacle of FIGS. 8 and 9.
Figure 8:
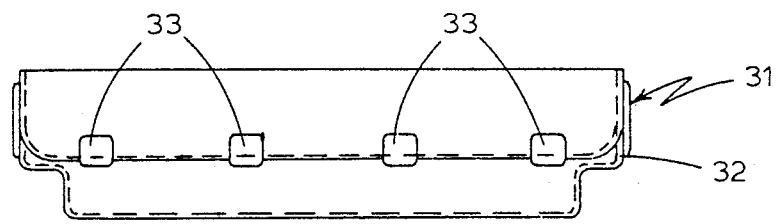
FIG. 8 is a front view of the drain receptacle disclosed in FIGS. 5-7.
Figure 14:
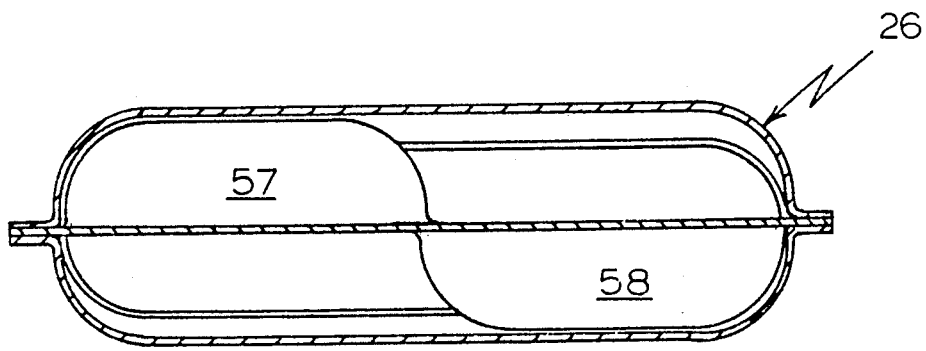
FIGS. 14 through 16 are three separate cross-sectional views taken in spaced planes through lines 14—14, 15—15 and 16—16 respectively of the container of FIG. 11 to illustrate stages of the longitudinally tapering configuration of the disinfection/rejuvenation container and the changing form of the wave-like divider providing two mirror-image compartments within the container.
Figure 15:
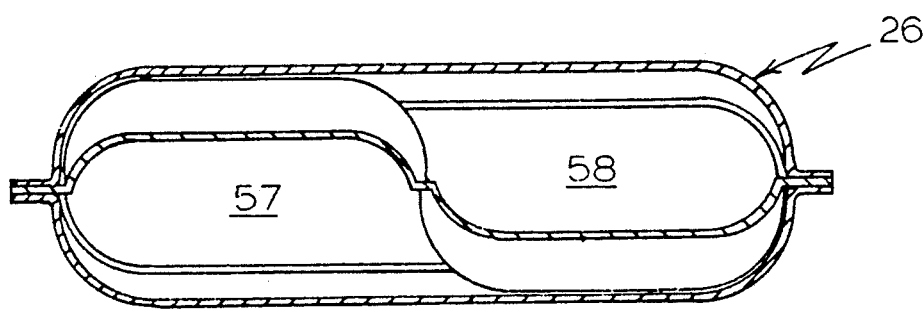
Figure 16:
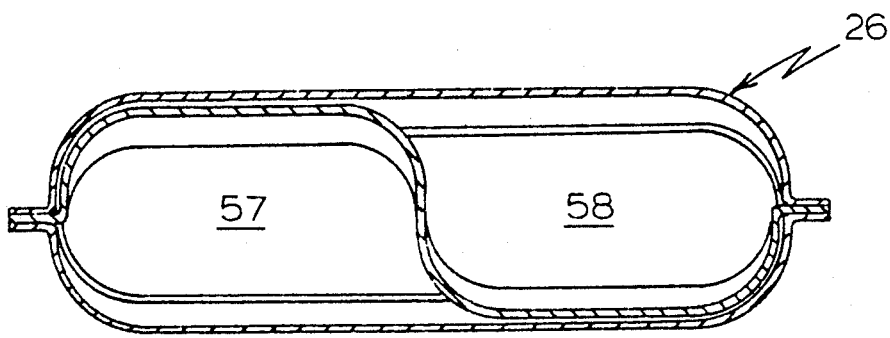

Referring to FIGS. 5 through 10 of the drawings, the inventive housing arrangement for the compact liquid purification system is disclosed as including a walled housing 28, which in the embodiment disclosed advantageously is of rectangular configuration but which can vary in shape in accordance with specific needs. Housing 28 serves to provide a main plenum 29 and is preselectively sized to contain liquid purification system 2 therein communicatively extending between inlet 3 which is connected to a water source, to the outlet, which is connected to user tap 22. The housing 28 can be formed from any suitably insulated metallic or plastic material and advantageously is formed from a thin but sturdy, light-weight aluminum. Positioned below plenum 29 to receive liquid condensates from the liquid purification system 2, which is disposed within plenum 29, is drain receptacle 31. Drain receptacle 31, which serves to allow evaporation of liquids received thereby, includes vertically extending side wall member 32 which extend normally from the lower peripheral edge thereof. As can be seen in FIGS. 5 and 6 of the drawings, the bottom peripheral edge portion of walled housing 28 can be inwardly curved to overlap in spaced relation with the outwardly curved upper edge portion of peripheral side walls 32 of drain receptacle 31. It is to be understood that any one of a number of spacer elements can be utilized to provide the spacing between the inwardly curved lower peripheral edge portions of housing 28 and the outwardly curved upper peripheral edge portions of drain receptacle side walls 32 so as to provide an elongated, air flow dispersing sound baffling passage therebetween. Advantageously, and as can be seen in FIGS. 8-10, the spacer elements can be an integral part of the peripheral side walls 32 of drain receptacle 31 in the form of selectively spaced outwardly extending protuberances 33 abutting and fastened by a suitable fastening device to the otherwise spaced inner face of the curved lower peripheral edge portion of wall housing 28. It, of course, is to be understood that these protrusions 33 could also be formed on the inner face of the inwardly curved edge of walled housing 28 to abut the outer face of peripheral side wall 32.

Again referring to FIGS. 5-7 of the drawings, it can be seen that the upper portion of plenum 29 serves to slidably receive the side edges of a hereinafter described plate member 34 of liquid storage receptacle 19 which form a part of liquid purification system 2. Suitably opposed, mirror-image, longitudinally extending slotted track members 36 of U-shaped cross-section have longitudinally extending bases appropriately mounted in fastened relation to the opposed inner faces of walled housing 28 to receive and support the opposed edges of plate member 34 between the spaced longitudinally extending side portions, as can be particularly seen in FIG. 5 of the drawings. As also can be seen in FIG. 5, plate member 34 serves to support from the lower face thereof intermediate opposed track members 36, a thermoelectric module 37 which includes a cold side 38 and a hot side 39. The hot side 39, in turn, has the heat exchanger or heat sink element 41 suspended therefrom in the form of spaced thermally conductive fin-like plate members. As can be particularly seen in FIG. 7 of the drawings, plate member 34 can be provided with a slotted gripping handle 42 on the front edge thereof to allow manual slidable movement of the entire storage receptacle assembly 19 on the opposed tracks 36.

Figure 17:
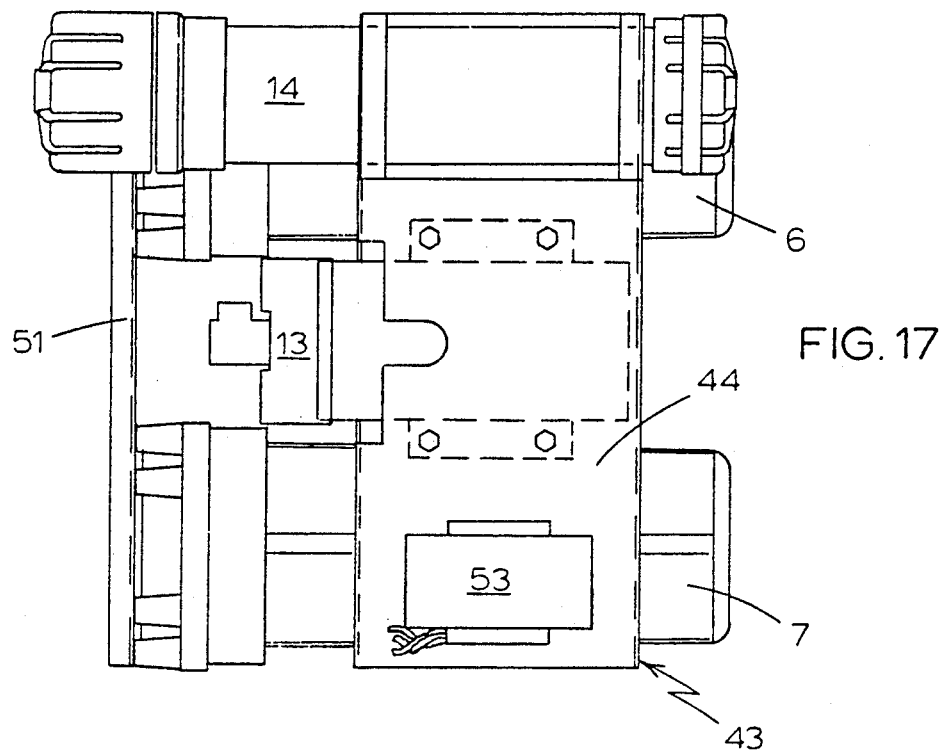
FIG. 17 is a top plan view of the novel frame arrangement for mounting the reverse osmosis unit and spaced power pack unit in a stacked upper tier of a frame and the two filter containers and pump therebetween in the lower tier of the frame of FIGS. 5-7 of the drawings, all as an isolated unit within the housing to balance and absorb pump vibrations.
Figure 18:
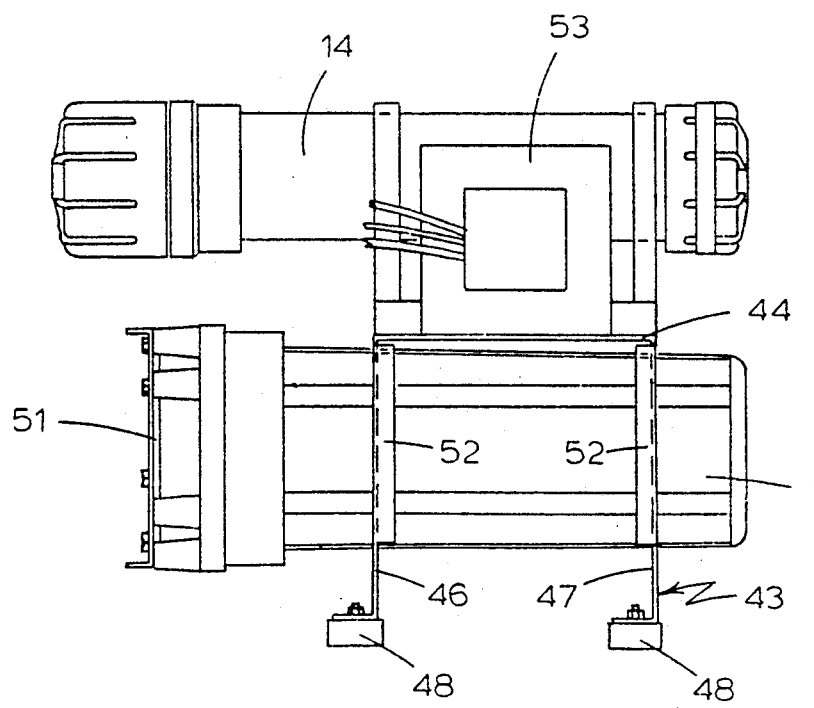
FIG. 18 is a side view of the isolating frame unit of FIG. 17.

Again referring to FIG. 5 of the drawings and also to FIG. 6 of the drawings, as well as to later FIGS. 17 and 18, it can be seen that the prefilter housing unit 6, diaphragm pump 13 and ion adding filter unit 7 are mounted in spaced longitudinally extending position to extend in spaced relation from the front wall of housing 28 toward the rear wall thereof by means of a unitary support from 43. Referring particularly to FIGS. 5 and 6, it can be seen that frame member 43, which can be formed from a unitary piece of sturdy sheet metal, such as aluminum or stainless steel, is appropriately sized to extend longitudinally between and spaced from the side walls of housing 28. The longitudinal cross-section of frame member 43 is of inverted U-shape to provide a base panel 44 and two spaced side panels 46 and 47. When properly inserted in the lower portion of plenum 29, base panel 44 extends in a horizontal plane and the spaced front and rear side panels or legs 46 and 47 respectively extend downwardly with the corner extremity of each side panel having a footing 48 which rests on the upper face of drain receptacle 31. It is to be noted that the lower face portion of drain receptacle 31 also is provided with similar footings 49 at the corners thereof so that the entire housing 28, including drain receptacle 31 and independently resting frame member 43 disposed thereon can rest on a flat support surface, such as a table top. The parallel front and rear side panels 46 and 47 respectively are provided with spaced, aligned apertures which are appropriately sized to receive therethrough in snug nestingly wedge-like engagement therewith in a lower tier the inwardly tapered filter housings 6 and 7. As can be seen clearly in FIGS. 5, 17 and 18, the front ends of spaced parallel, tapered filter housings 6 and 7 are connected by a slotted connecting panel member 51 to allow ready removal of both tapered housings 6 and 7 from frame member 43. It is to be noted that suitable gaskets 52 which can be of plastic, are provided around the peripheries of the aligned apertures to insure firm wedging of the tapered filter housings 6 and 7 therein. As can be seen in FIGS. 5 and 18 of the drawings, suspended in the lower tier from the underside of horizontal base panel in spaced relation between frame supported filter housings 6 and 7 is diaphragm pump 13 and mounted in a upper tier on the upper face of horizontal base panel 44 in spaced relation from either side of the heat exchange fins 41 is the reverse osmosis unit 14 and a power pack 53. This power pack 53 which includes an appropriate transformer and voltage regulator serves to provide a selected level of electrical energy (12 volts) to several parts of liquid purification system 2 requiring such energy and which are disposed in plenum 29, including but not limited to the thermoelectric module 37 and blower 56 (FIG. 6) which moves ambient air from inlet 20 in walled housing 28 over heat exchange fins 41 to which the blower is attached and downwardly through the aforedescribed outlet passage defined between the spaced walls of walled housing 28 and drain pan 31. The ultra-violet radiation tube 12, the pump 13 and the heater plate 54 in storage receptacle 19 (as described hereinafter) can be supplied with electrical energy from a direct separate appropriate energy source, such as a 220 volt source.

Referring to FIGS. 6 and 27 of the drawings which discloses a portion of the front cover for walled housing 28, it can be seen that ultra-violet tube 12 can be vertically positioned on the inside face of the front cover adjacent the novel treatment container arrangement 26, tube 12 further serving to light the front panel, a portion of which can be in the form of a transparent polycarbonate window to block ultra-violet radiation from tube 12. In this regard, it is to be noted that tube 12 and the conduit sections therearound can, in turn, be surrounded with a radiation absorption and reflective shield (not shown) which, advantageously, can be in the form of a suitable number of layers of aluminized coated sheets of Mylar material which serve to absorb the emitted radiation from tube 12 and to reflect a portion thereof back to the surrounding coil sections. It is to be understood that, for the purposes of clarity of understanding, details of the electrical and fluid circuitry are not disclosed in FIGS. 5-28 of the drawings since it is considered that the schematic flow diagrams of FIGS. 1-4 suffice for this purpose.

Referring to FIGS. 12-16 of the drawings, details of the novel disinfection/rejuvenation treatment container 26 which can be utilized in the reverse osmosis "loop circuit" 15 (FIGS. 1 and 3) are disclosed. This treatment container 26 can be unitary in form and is fluid impervious to provide two fluid impervious compartments 57 and 58 for introduction of disinfection and rejuvenation fluids respectively for treatment of the reverse osmosis unit 14. In the instance of water purification, appropriately selected acid and base fluids are respectively provided, one of the two fluids being stored in each compartment. A compartment header block 59 is mounted in sealed relation at corresponding fluid communication ends for each of the compartments 57 and 58, this unitary header block 59 serving to provide a header pair, one for each compartment 57 and 58. Although it would be possible to use separate headers, in the embodiment disclosed in FIG. 12 of the drawings, the header for each compartment, or in other words the header pair, is formed from the single unitary header block 59. Each compartment header of the header pair in unitary header block 59 is provided with a spaced set of three mating port connections 61, 62, 63 which are embedded in unitary header block 59 in mirror-image relation, as can be seen in FIG. 12. Although not shown in detail, the upper end of each port connection of each set can, when treatment container 26 is properly positioned, communicate with the respective compartments 57, 58 thereabove. The lower end of each port connection is of a female nature and when a respective compartment 57, 58 is in operating position, receive a male nipple of connections 64, 66, 67 embeddedly mounted in the treatment header block 68. In effect, the lower female ends of connections 61, 62 and 63 of a connection et for a compartment connect respectively with the nipples of connections 64, 66, 67 in a connecting arrangement of 61-64, 62-66 and 63-67. The connected arrangements 61-64, 62-66 and 63-67 can serve as treatment fluid outlet, treatment fluid inlet and air inlet/outlet for each compartment 57 and 58 when the particular connection set for one of the two compartments 57 and 58 is placed in connected or engaged operation position with the respective male nipples 64, 66, 67 of treatment header block 68 of the fluid system 2. Although not shown in detail, as can be seen in FIG. 6 of the drawings, treatment header block 68 to which compartment header block 59 is connected, can be positioned in drain receptacle 31. In this regard, it is to be noted that a tie-down connection in the form of a nipple 69 is provided in treatment header block 68. This tie-down connection 69 serves to engage with the female portion of connection 61 of that set of mirror-image connections 61, 62, 63 of a compartment 57 or 58 which is not in operating position. A suitable spring loaded latch 71, such as a quick disconnect latch sold by Colder Products of Minneapolis, Minnesota, cooperatively associated with tie-down nipple or connection 69, serves to yieldingly hold the tie-down connection 69 in engagement with the female portion of connection 61 of that mirror-image set of connections not in operating position. Thus, from the above description, it can be seen that by merely rotating compartment header block 59 through one hundred eighty degrees (180°), one of the two disinfection/rejuvenation compartments 57 and 58 can be connected to the treatment header block 68 which comprises part of liquid purification system 2, with the other compartment not operatively connected being appropriately anchored on nipple 69 by spring loaded latch 71. To readily release quick disconnect latch 71 an appropriate manual access recess 72 can be provided adjacent female connection 61 on either side of compartment header block 59.

In accordance with another feature of the present invention the fluid impervious disinfection/rejuvenation compartments 57 and 58 can be formed from three vacuum molded thin, light rigid panels formed from a suitable fluid impervious material, such as an appropriate polycarbonate compound, which material also can be used to form the compartment header manifold 59 and the treatment header block 68 above described. Two of the three panels forming fluid impervious compartments 57 and 58, namely outside panels 73 and 74 are identically sized and flanged along three edges—namely, the two opposed side edges and the base edge from which the side edges extend. These three flange edges of the two outside panels 73 and 74 are positioned in mirror-image facing relation to initially provide a chamber of longitudinally extending rectangular configuration form to include an open mouth header inlet end adjacent and fastened to the header block 59, which provides, as a unit, the aforedescribed compartment headers for each compartment 57 and 58. Opposed to the open-mouth header end, the bases of the flanged opposed panels provide the closed end of the compartments 57 and 58. A third panel 76 interposed between mirror-image edge flanged panels 73 and 74 serves as a divider wall therebetween to provide fluid impervious compartments 57 and 58. Panel 76 can be in the form of a longitudinally-extending wave-shaped sheet to extend longitudinally between the mirror-image positioned first and second outside panels 73 and 74 from the open-mouth header inlet end to the opposed closed end and from diametrically-opposed corners of the longitudinally-extending chamber of rectangular configuration formed by outside panels 73 and 74 with the longitudinally-extending opposed side and base edges of all three panels—namely outside panels 73 and 74 and divider panel 76 having a common seam 75 which extends along the opposed side and base edges thereof to provide the pair of compartments 57 and 58 in mirror-image nesting relation. These compartments 57 and 58 are geometrically of triangular-like cross-sectional configuration to extend from the header ends to the closed end. Since the panels and header can be formed from a similar molded plastic material the common seam along the opposed side and base edges of the panels can be formed by fusing, as can the seam between the open-mouth compartments and the header block 59. In this regard, it is to be noted that header block 59 is provided with a suitably recessed surrounding peripheral edge 77 and a wave-like recess 78 extending centrally between the opposed sides of the peripheral recessed edge 77 to overlappingly receive and respectively nest with the joined header edges of the three panels 73, 74 and 76. It further is to be noted that connected to each inlet connection 62 and disposed within compartments 57 and 58 are pressure sensing valves 79 and 81 which are utilized within each compartment to regulate flow during the treatment cycle, to determine compartment fill and, in an emergency, to shut off fluid flow to the compartment at a preselected volume level.

It is to be understood that the aforedescribed novel arrangement can be employed to provide disinfection/rejuvenation units of different geometric configurations and possibly even of a different number of compartments, utilizing the unique method of assembly of opposed mirror-image panels with intermediate divider panels, the opposed side and base edges being joined by a common seam to minimize fusing problems which would otherwise arise.

Referring to FIGS. 2, 4 and FIGS. 19-25 of the drawings, details of the fluid storage receptacle 19 and associated accessories utilized therewith can be seen. In describing the fluid flow through the separate bays 82 and 87 in compartments 83 and 88 respectively of the storage receptacle 19 of the invention as is set forth in FIGS. 2 and 4 of the drawings, purified fluid passing from the helically-wound section 18 surrounding ultraviolet radiation tube 12 enters into the separate expansible cold fluid storage bag member 82 occupying the cold storage compartment 83 of storage receptacle 19. When the cold storage bag member 82 reaches a predetermined level, it actuates a novel, magnetically-controlled switch, described hereinafter, to cause fluid flow to the cold bag member 82 to cease. When cold fluid is removed from the cold storage bag member 82 to flow through control valve 21 to user tap 22 after a certain lag period or hysteresis lag in the magnetization of the switch, flow to the cold bag member 82 again commences. If control valve 21 is closed to user tap 22, the level in cold bag member 82 rises. When the head pressure reaches a preselected point in cold bag member 82, a novel by-pass check valve 86, also described hereinafter, opens to allow some of the fluid directed to cold bag member 82 to pass through the hot side 39 of the thermoelectric module 37 for heating prior to entry into hot storage bag member 87 located in hot storage compartment 88 of storage receptacle 19. It is to be noted, in this regard, that the cold side 38 of thermoelectric module 37 is positioned adjacent cold storage compartment 83 so as to cool the fluid introduced into cold storage bag member 82. Advantageously cold storage bag member 82 and hot storage bag member 87 can be formed from sheets of a thin, thermally-conductive material, such as Mylar. In storage receptacle 19, the hot storage compartment 88 is provided in the floor thereof with a suitable foil strip heater 89 such as one sold by Minco of Minneapolis, Minn. Advantageously, this foil strip heater 89 can be wrapped or otherwise protected with an insulating material such as a closed cell silicone foam which insulator serves to modulate the temperature to fall within a range of approximately 250° F. to 300° F. A suitable over temperature regulator (not shown) can be provided to interrupt a 220 volt energy supply to the foil heater from the same supply source supplying energy to ultra-violet radiation tube 12. A portion of the heated fluid in hot storage bag member 87 is caused to vaporize by the temperatures imparted thereto, thus reducing bacterial contaminants with the thus vaporized and bacterial treated vapors flowing over from hot storage bag 87 to cold storage bag 82. These vapors condense in cold storage bag 82 with the fluid level rising in the bag and the aforedescribed cycle of fluid flow is repeated. If it is desired to obtain hot fluid at user tap 22, it is only necessary to adjust three port or three-way valve accordingly, shutting off cold fluid flow from cold storage bag 82 thereto and turning on hot fluid flow from hot storage bag 87.

In FIGS. 3 and 4 of the drawings, the path of fluid flow is, in many respects, similar to that aforedescribed. However, in these drawings, the cold fluid from cold storage bag 82 is passed to helical coil section 27, also surrounding ultra-violet radiation tube 12 for a third ultra-violet radiation treatment. From there, the fluid passes through the cold side 38 of thermoelectric module 37 and then to user tap 22 through flow control 21. As in FIGS. 1 and 2, appropriate control valving such as at 21 can be employed to allow alternative hot and cold fluid flow to user tap 22 and, if desired and as shown, appropriate heating foil and vaporization circuitry between bags 82 and 87 can be utilized.

Referring to FIG. 19 and 20 of the drawings, the novel switch member 91 and aforementioned plate member 34 with slotted gripping handle 42 for storage receptacle 19 are disclosed in more detail. Switch member 91 is disclosed as associated with the cover 92 for storage receptacle 19. Cover 92, like storage receptacle 19 of which it is a part and accordingly-sized and shaped to engage the lower portion thereof, can be formed from a suitable, insulated foam polyurethane material in a manner comparable to the novel method disclosed in FIG. 28 and described hereinafter. Cover member 92 is formed with a lower recess 93 in which three magnetically-actuable contact switches 94 are embedded in a common horizontal plane at approximately 120° to each other in a common circle, these switches being included in parallel in an appropriate electrical circuit (not shown) which controls fluid flow to bag members 82 and 87. A Mylar sheet 96 is fastened to the lower face of cover 92, this sheet being sized to cover recess 93. Supported within recess 93 by sheet 96 is a second sheet 97, which sheet determines a common plane and on which are mounted three magnets 98 which like switches 94 are arranged to fall within a common circle, one hundred and twenty degrees (120°) apart to determine a common plane and to be aligned with contact switches 94. Advantageously, sheet 97 can be of a rigid, polycarbonate material or any other suitable material having low magnetic and thermal conductivity. Accordingly, when any part of storage bag 82 in compartment 83 of storage receptacle 19 reaches a certain preselected level it moves one of magnets 98 supported on sheet 97 toward an aligned contact switch 94 and causes fluid flow to cold and hot storage bags 82 and 87 to be interrupted. It is to be noted that suitable vent lines 90 are provided in cover 92 to allow ambient communication with compartments 83 and 88 and recess 93.

Referring to FIG. 20 of the drawings, details of the novel plate member 34 which is embedded in the lower portion of storage receptacle 19 are disclosed. Plate member 34, which advantageously can be formed from a thin, stiff metallic sheet desirably of preselected thermal conductivity, such as aluminum, extends in a flat plane through the lower portion of polyurethane storage receptacle 19 Plate 34 is provided with selectively-sized and positioned passages therein in the form of spaced lineal aligned flow-through circular holes 99 and spaced lineal-aligned slots 101 which are arranged geometrically to define two rectangular forms which serve to provide the geometric wall limitations for cold and hot storage compartments 83 and 88 above discussed, all in accordance with a novel forming method described hereinafter. In addition, these spaced circular and lineal passages 99 and 101 serve to further define tortuous pathways therebetween to reduce thermal conductivity through the plate from one formed compartment 83 to the other formed compartment 88 with the spacing between holes 99 and slots 101 also allowing for a certain amount of flexibility relative the respective cold and hot storage receptacle walls formed on one face of the plate and between the walls and the bottom of the receptacle formed on the other face of the plate in a manner described hereinafter.

Figure 21:
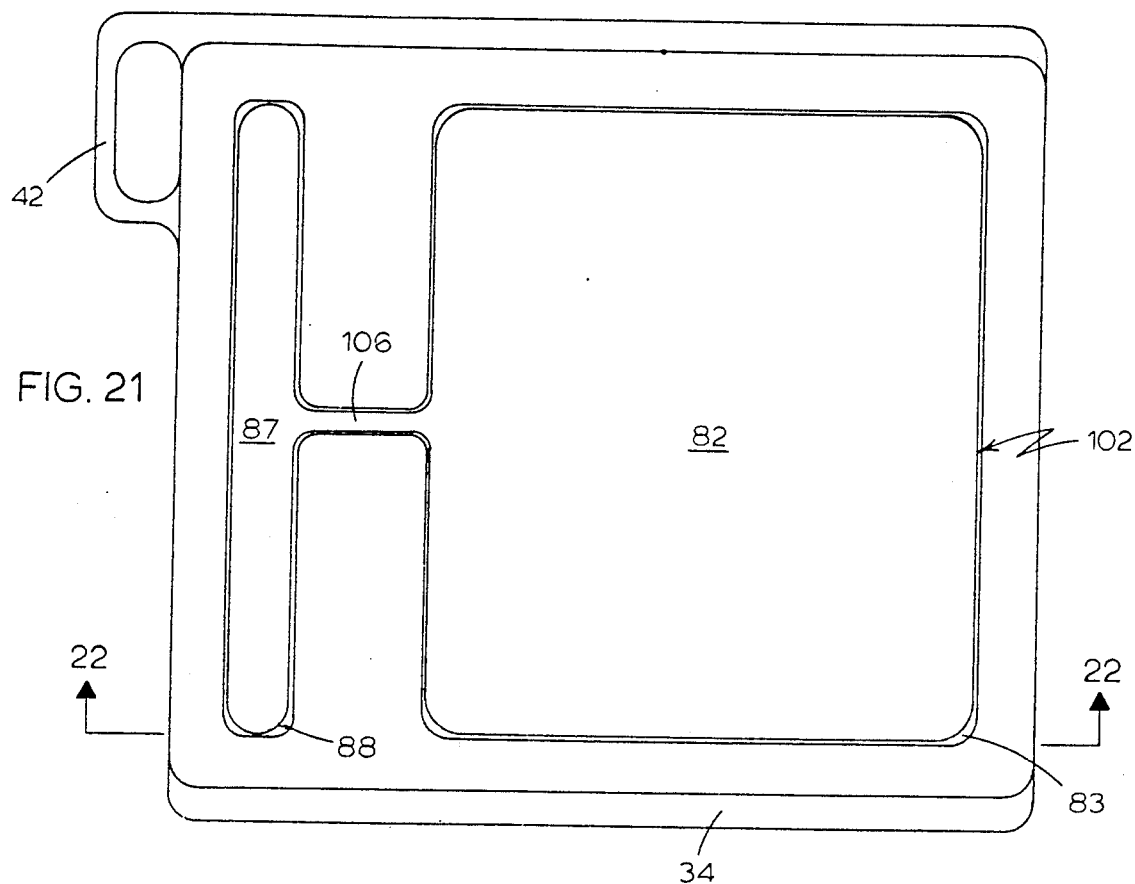
FIG. 21 is a schematic plan view of a modified embodiment of the storage receptacle incorporating a novel unitary bag member assembly, contoured to provide separate communicating cold and hot bag members for the separate compartments of the storage receptacle.
Figure 22:
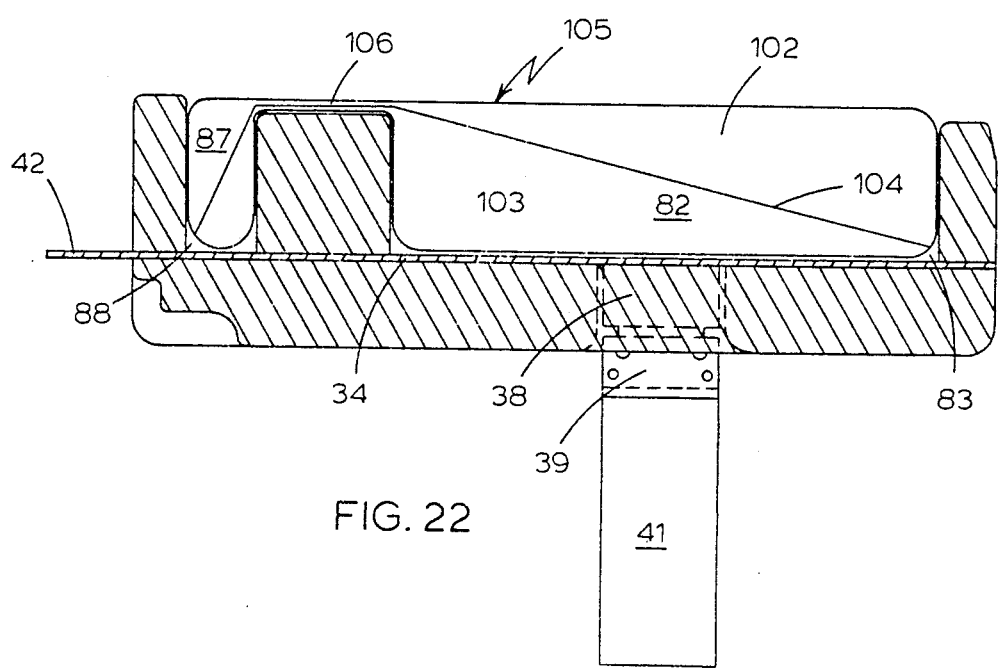
FIG. 22 is a schematic side view of the storage receptacle and sectioned unitary bag member of FIG. 21 further disclosing the thermal electric element and associated heat exchanger fins suspended from the storage receptacle plate.

Referring to FIGS. 21 and 22 of the drawings, a novel modified arrangement for cold storage bag member 82 disposed in cold storage compartment 83 and hot storage bag member 87 disposed in hot storage compartment 88 of storage receptacle 19 is disclosed. In this novel embodiment of the invention, bag members 82 and 87 are shown as part of the same unit bag assembly 105 formed and geometrically-contoured and sized from two appropriately-sized and shaped sheets or plackets 102 and 103 of thin flexible material, such as Mylar, which are cut and fuse-joined in facing mirror-image form along a common seam 104 to provide pockets forming bag members 82 and 87 which are communicatively joined along a cut and shaped common passage 106 extending between the pockets forming bag members 82 and 87.

Referring to FIGS. 23-26 of the drawings, details are disclosed of a novel by-pass check valve 86 which can be associated with fluid storage receptacle 19 when employed in a liquid purification system such as is set forth in FIGS. 1 and 2 of the drawings. This novel check valve 86 is extremely straightforward and economical in construction, assembly and maintenance yet efficiently accomplishes the purposes for which it is intended. For operational purposes, and referring to FIG. 2 of the drawings, it simply comprises a break and spacing in the vertically-extending portion of silicone by-pass conduit line associated with storage receptacle 19 which line extends between cold storage bag 82 and the hot storage bag 87 passing through the hot side 39 of thermoelectric module 37, as previously described. This break and spacing of the by-pass line is illustrated in FIGS. 23-25 and for purposes of description is referred to as spaced and aligned lines 107 and 108. The ends of lines 107 and 108 are surrounded by a tubing sleeve 109 of appropriate length with an inner diameter which approximates the outer diameter of the by-pass lines 107 and 108. The tubing sleeve 109, which advantageously can also be of silicone material, can be held in fast position by a suitable ambient hardening silicone adhesive paste to define a float chamber 111 between the broken and spaced vertically-extending by-pass line. Positioned within chamber 111 is a float member 112, which, as shown, can be in the form of a ball. Float 112 is of a preselected specific gravity slightly lower than the specific gravity of the liquid to be stored in storage receptacle 19. For example, float 112 can have a specific gravity of 0.91 when the liquid to be stored is water. Float 112 is appropriately-sized to float and cover the inner diameter of line 107 of the vertically-extending by-pass line when the differential pressure between bag members 82 and 87 is at a preselected lower level (FIGS. 24). When the differential pressure between bag members 82 and 87 increases, it forces float 112 downwardly away from the extremity of line 107 to open line 107 to fluid flow, the float being urged by the difference in pressure toward spaced and aligned line 108. In accordance with one feature of the novel invention, the extremity of aligned line 108 spaced and opposed to the extremity of line 107 is so shaped that float 112 can nest but not cover the opening of this extremity. In the embodiment disclosed, the extremity of line 108 can be of triangular apex shape as at 113 with a counter groove 114 centrally disposed at apex 113 sized in breadth to receive float 112 in nesting seated relation therewith but sized in depth to prevent the nesting, seated float 112 from covering the opening of line 108 so as to allow fluid to continue to pass therethrough from opened, aligned and spaced line 107 and the chamber 111.

Referring to FIG. 26, housing 28 is disclosed with the front wall thereof, herein referred to as front wall 128, shown as being shaped to include a user tap recess 129 therein to receive the aforedescribed user tap 22 which can be any one of a number of commercially-available spigots, such as the one disclosed and commercially available from Tomlinson Company. This user tap spigot 22 conveniently is designed to receive and support a glass at a location below the spigot spout to pour fluid into the glass by applying a nominal hand pressure on the spigot-supported glass.

As can be seen in FIG. 27 of the drawings, the upper portion of the front wall 128 of housing 28, which front wall extends the height of the housing, is provided with a pair of generally U-shaped over-center pivotal hinges 131. One leg extremity 132 of each hinge 131 (only one being shown) is shown as pivotally-mounted to the side wall of housing 28 with the opposite leg extremity 133 being fastened to the upper portion of the curved side of front wall 128. With this arrangement, it is possible to quickly gain full access to plenum 29 of housing 28 to service any one of the several aforedescribed novel parts of the liquid purification system 2 disposed therein. Advantageously over-center hinges 131 are so designed as to permit the front cover to be pivoted through approximately one hundred and thirty degrees (130°) to a position above the top wall portion of housing 28. However, it is to be understood that the over-center hinges 131 can be designed to allow other pivotal situations, if so desired.

Referring to FIG. 28, mold structure for the unique formation of the lower portion of aforedescribed storage receptacle 19 is disclosed. This structure includes a pair of mating upper and lower mold halves 134 and 136 respectively which are internally contoured to provide the bottom wall of the lower portion of storage receptacle 19 and the peripheral and intermediate side walls extending from the bottom wall to appropriately define the aforedescribed fluid compartments 83 and 88 of storage receptacle 19 which receive the cold and hot storage bags 82 and 87, respectively. To accomplish the unique method for forming storage receptacle 19 the upper and lower mold halves 134 and 136 are closed in mating relation along opposite faces of aforedescribed plate member 34. A suitable plastic material, such as a closed cell foam polyurethane along with an appropriate catalyst is then introduced under pressure from a storage source not shown through lower mold inlet 137. Advantageously, the foam polyurethane selected can have appropriately high heat resisting and insulating qualities which are required for the varying temperatures realized in cold and hot storage compartments 83 and 88 respectively. The foam polyurethane introduced into lower mold half 136 is in sufficient quantity and under sufficient pressure to pass through the holes 99 and lineal slots 101 which are aligned with appropriately-designed recesses to provide the bottom or base wall and the connected or integral peripheral side and intermediate walls of storage receptacle 19 as above described.

It is to be understood that not only is storage receptacle 19 formed by a novel method but, in addition, the method of forming and assembling treatment container 26 (FIGS. 11-16) and the method of forming and assembling the interconnected cold and hot storage bags 82 and 87 (FIG. 21) respectively are novel. In forming treatment container 26, as aforedescribed, a longitudinally-extending compartment header block 59 is formed from a suitable plastic material such as polycarbonate to include the aforedescribed fluid outlet and inlets and air connections 61, 62 and 63 for each separate fluid compartment 57 and 58. The header block is shaped to include an upper peripheral recessed edge 77 and a wave-like recess 78 extending centrally along the upper face of the block between the opposed longitudinal sides thereof. Mirror-image outside panels 73 and 74 and a compartment dividing wave-like intermediate panel 76 are mold formed with the panels being so configured and sized that the outside panels 73 and 74 provide a rectangular-shaped chamber therebetween which subsequently is divided into two compartments 57 and 58 with the opposed side and bottom edges of the two outside panels 73 and 74 and the intermediate panel 76 in facing relation with each other to be fuse joined in open-ended two compartment relation. In formation, the open-ended edges of the outside panels 73 and 74 and the end portions of intermediate panel 76 are positioned to surround and be sealed to the peripherally surrounding recessed edge 77 of block 59 with the intermediate edge of wave-like intermediate panel 76 nestingly engaging and being sealed to the wave-like recess 78 in header block 59.

In forming cold and hot storage bags 82 and 87, as aforedescribed, two similarly-shaped sheets 102 and 103 of fluid impervious material, such as Mylar, are each sized, shaped and cut as identical plackets to provide bag sides 82 and 87 with a side of a connecting portion 106 therebetween. The plackets are then placed in mirror-image relation and sealed completely along the edges thereof as at 104 so as to provide bags 82 and 87 joined by connecting passage 106 extending therebetween.

Referring to FIGS. 29-32, a novel fluid flow control mechanism 143 for flexible conduits 141 and 142 is disclosed which can be used in place of solenoid 21. These conduits 141 and 142 are used to alternately connect cold storage bag member 82 and hot storage bag member 87 respectively and which are located in storage receptacle 19 to user tap 22. These conduits 141 and 142 are advantageously made of a long-wearing, flexible silicone material inherently capable of emitting a microscopically detectable silicone lubricant when flexed. The conduits are of a preselected thickness in accordance with desired fluid flow capacity from the respective storage bag members 82 and 87 to which they are connected and lead to a liquid outlet and user tap 22 through an appropriate Y-connection (not shown), each passing through the novel fluid flow control mechanism 143 which serves to deliver fluid from each of said storage bag members 82 and 87 alternatively to user tap 22. This liquid control mechanism 143 is comprised of a pair of relatively slidable, superposed plates 144 and 146 which can be mounted appropriately on one of the walls of walled housing 28 with a manual gripping handle 167 mounted on pin 151 projecting through the mounted wall to provide relative slidable movement between plates 144 and 146. Suitably spaced teflon washers 147 can be provided between plates 144 and 146 to space the plates and to enhance relative slidable movement therebetween. Base plate 144, which can be provided at diametrically opposed corners with slots 148 to allow relative movement of this base plate on the wall to which it is mounted, can be of elongated rectangular shape of a preselected length. Superposed plate 146 can be of a shorter length than base plate 144 and can be of S-shape with a width substantially equal to base plate 144. These plates 144 and 146 can be made from a suitable light, sturdy, metallic material. A suitable elongated guide slot 149 is provided in base plate 144 midway between the sides thereof with pin 151 having gripping handle 167 fastened on superposed plate 146 slidably projecting therein. Spaced, elongated guide slots 153 and 154 are aligned with each other on superposed plate 146 and with guide slot 149 on base plate 144. Pins 156 and 157 mounted on base plate 144 project through guide slots 153 and 154 on plate 146 respectively to permit relative slidable movement therebetween. A pair of conduit receiving rings 158 and 159 a and pair of conduit receiving rings 161 and 162 are mounted in staggered positions on each plate 144 and 146 with the rings on corresponding sides of relatively slidable plates 144 and 146 being aligned and so positioned that when the aligned rings 162 and 159 on corresponding sides of the two relatively slidable plates are proximate to each other, then the aligned rings 158 and 161 on the other corresponding sides of the two relatively-slidable plates are remote from each other. These aligned rings are so sized that each pair on corresponding sides has one of the two conduits 141 and 142 passing therethrough. A pair of gripping sleeves 163 and 164, which can also be of suitable silicone tubing material, are sized to snugly engage the outer peripheries of conduits 141 and 142, and are fastened to the outer peripheries on opposite sides of each ring. Thus each conduit can be properly gripped in a preselectively flexed minimum arc position to be in open position and a preselectively flexed maximum arc position to be in closed position with the open and closed position alternating for each conduit as can be seen in FIGS. 29 and 30 and FIGS. 31 and 32. This serves to allow alternative flow of fluids from storage bag members 82 and 87 in storage receptacle 19. It is to be noted that a suitable helical spring 166 can be arranged to be fastened at one end thereof to actuating pin 151 which pin can be extended, as above described, and can be arranged to project through a wall of the walled housing 28 with a gripping handle 167 fastened thereto. The other end of spring 166 is fastened to pin 157 extending through slot 154 on the superposed plate 146. This helical spring 166 serves to spring bias the relative movement between plates 144 and 146 so that when conduit 142, which in the embodiment illustrated is connected to hot storage bag member 87 is urged to fully open position as shown in FIGS. 29 and 30, the urging force is against the resistance of the spring biasing means 166. In this regard, it is to be noted that the spring-like effect in each of the silicone conduits also serves to urge each conduit to its selected destined position. Although any one of a number of suitable flexible materials can be selected for flow-through conduits 141 and 142 besides silicone, desirably the conduit material selected should have long-lasting flexing qualities and be of appropriate thickness and characteristics to seal from the center of the axial line of fluid flow through the conduit to the inner peripheral sides thereof. It also is to be noted that the selection of the flexed arc positions of each conduit need not be from an alternative minimum arc, fully-open to a maximum arc, fully-closed position but that in other situations, it would be possible to control the flow somewhere in between these two positions.

From the above description, it can be seen that a novel, light, compact, easy-to-ship, easy-to-store, fluid purification structure and method are provided including numerous inventive features which permit economic manufacture and operation, providing for a highly-efficient and economical system for fluid purification.

The invention claimed is:

1. In a fluid liquid purification apparatus having a reverse osmosis treatment system with a treatment header with spaced port connections therein for receiving treating fluid, a unitary disinfection/rejuvenation fluid impervious treatment container having at least one fluid impervious compartment for introduction of appropriate treating fluids respectively therein the improvement comprising: a compartment header mounted in sealed relation at the end of said compartment, said compartment header having spaced mating port connections adapted to mate with correspondingly spaced port connections in said treatment header in said reverse osmosis treatment system of said liquid purification apparatus to permit connection of said compartment with said treatment system including means for cooperating with said liquid purification apparatus.

2. The unitary disinfection/rejuvenation container of claim 1, said treatment container having a fluid impervious dividing wall to provide two fluid impervious compartments said port connections for each of said compartment headers comprising one set of a pair of spaced sets of mirror-image spaced port connection sets in said compartment headers to allow said compartments to be alternatively coupled to corresponding mating port connections in said treatment header of said treatment system for alternative introduction of different fluids from each of the coupled compartments.

3. The unitary disinfection/rejuvenation container of claim 1, and a tie-down connection cooperative between said compartment headers and said treatment header on said liquid purification apparatus to tie-down and fasten that compartment header not in engaging relation with said treatment header.

4. The unitary disinfection/rejuvenation container of claim 1, said container having a longitudinally extending rectangular configuration from said header end to said closed ends in said container with said dividing wall extending therebetween from diametrically opposite corners of said container to provide said fluid impervious compartments, said compartments being of generally pyramid-like, stable configuration.

5. The unitary disinfection/rejuvenation container of claim 1, said container being formed from three stable plastic panels of fluid impervious material, two panels of which are identically sized and flanged along three edges thereof including opposed side and base edges to be positioned in mirror-image facing relation to initially provide a chamber in longitudinally extending rectangular configuration form to include an open mouth header end adjacent and fastened to said header for each compartment and a spaced opposed closed end with said third panel being sized to serve as a divider wall therebetween said divider wall panel being in the form of a longitudinally-extending wave-shaped divider sheet to extend longitudinally between said mirror-image positioned first and second panels from said open mouth compartment header inlet end to said closed end and from diametrically opposed corners of said longitudinally extending chamber of rectangular configuration formed by said first and second mirror-image positioned panels with the longitudinally-extending opposed side and base edges of said first, second and third panels extending from said header to said opposite closed end having a common seam along said opposed side and base edges thereon and with the edges of all three panels adjacent said compartment headers being sealed thereto to provide a pair of mirror-image nesting adjacent compartments of stable, triangular configuration extending inwardly from said header ends to said closed ends.

6. A method comprising: forming a molded compartmental storage receptacle including means for cooperating with a liquid purification apparatus, by, molding two storage receptacle side members sized and geometrically shaped to face each other to define an open mouth receptacle of preselected geometric configuration; and joining together said side edges and base edges of said mirror-image side members and said divider member along a continuous seam to provide a molded compartmental storage receptacle.

7. The method of forming the storage receptacle of claim 6, molding at least one divider member sized and geometrically proportioned to correspond with said side members so as to be assembled in partially spaced relation therebetween to provide adjacent compartments; and molding a header for said molded storage receptacle with compartmental connections disposed therein positioned to be in alignment with each of said adjacent compartments in said molded storage receptacle; and joining those open-mouthed edges opposite said joined base edges of said molded storage receptacle to said molded header.

8. The method of forming the storage receptacle of claim 7, said compartmental connections for each of said compartments in said storage receptacle being positioned in mirror-image relation to allow alternative connection of each compartment with the same connecting treatment header.

9. The method of forming the storage receptacle of claim 7, said molded header being molded to have peripheral recesses along the periphery thereof and intermediate the side edges thereof to receive said open-mouthed edges and to be joined thereto by fusion.

10. The method of forming the storage receptacle of claim 7, said molded side members, divider member and header being of fluid impervious polycarbonate material.

11. A method comprising: forming a molded fluid-impervious compartmental storage receptacle including means for cooperating with a liquid purification apparatus, by, molding two storage receptacle side members and a wave-shaped divider member of fluid-impervious polycarbonate material; said side members and wave-shaped divider member being sized and geometrically shaped and proportioned that when said side members are placed in mirror-image relation with said divider member in partial spaced relation therebetween two triangular-like mirror-image separate fluid-impervious, open-mouthed compartment members are formed; positioning said side members and divider member accordingly in such relationship and fusing said side and base edges together to form said triangular-like compartments; forming a header of solid polycarbonate material with sets of mirror-image fluid connections embedded therein positioned to communicate with each of said triangular-like compartments and alternatively with connections in a treatment header, said header being formed with a peripheral-surrounding recess and a wave-shaped recess extending between opposed sides thereof to receive the open-mouthed edges of said compartments; and, fusing said edges in said header recesses to said header.

* * * * *

UNITED STATES PATENT AND TRADEMARK OFFICE
CERTIFICATE OF CORRECTION

PATENT NO. : 5043066
DATED : August 27, 1991
INVENTOR(S) : Steven L. Miller, et al It is certified that error appears in the above-identified patent and that said Letters Patent is hereby corrected as shown below:

Column 18, line 13 (Claim 3); line 19 (Claim 4); line 27 (Claim 5), each appearance, change "1" to -- 2 --;

Column 18, line 61 and 62 (Claim 6) delete "and said divider member".

Signed and Sealed this

Fifteenth Day of June, 1993

*Attest:*

MICHAEL K. KIRK

*Attesting Officer*           *Acting Commissioner of Patents and Trademarks*